(12) United States Patent
Kim et al.

(10) Patent No.: US 9,437,362 B2
(45) Date of Patent: Sep. 6, 2016

(54) APPARATUS AND METHOD FOR WIRELESS POWER RECEPTION

(71) Applicants: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Seong Joong Kim, Suwon-si (KR); Yong Seong Roh, Incheon (KR); Young Jin Moon, Gwangju (KR); Yun Kwon Park, Dongducheon-si (KR); Keum Su Song, Seoul (KR); Chang Sik Yoo, Seoul (KR); Chang Wook Yoon, Seoul (KR); Jin Sung Choi, Seoul (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 480 days.

(21) Appl. No.: 13/927,181

(22) Filed: Jun. 26, 2013

(65) Prior Publication Data
US 2014/0015331 A1  Jan. 16, 2014

(30) Foreign Application Priority Data

Jul. 10, 2012  (KR) ........................ 10-2012-0074900

(51) Int. Cl.
| | | |
|---|---|---|
| H01F 38/14 | (2006.01) | |
| H02J 5/00 | (2016.01) | |
| H02J 7/02 | (2016.01) | |
| H04B 5/00 | (2006.01) | |

(52) U.S. Cl.
CPC ............... *H01F 38/14* (2013.01); *H02J 5/005* (2013.01); *H02J 7/025* (2013.01); *H04B 5/0031* (2013.01); *H04B 5/0037* (2013.01)

(58) Field of Classification Search
None
See application file for complete search history.

(56) References Cited

U.S. PATENT DOCUMENTS

| | | | |
|---|---|---|---|
| 2007/0100506 A1* | 5/2007 | Teichmann | ............... H02J 3/24 700/297 |
| 2008/0297118 A1 | 12/2008 | Honma et al. | |
| 2010/0171369 A1 | 7/2010 | Baarman et al. | |
| 2011/0065398 A1 | 3/2011 | Liu et al. | |
| 2013/0154373 A1* | 6/2013 | Lisuwandi | .............. H02J 5/005 307/34 |

FOREIGN PATENT DOCUMENTS

| | | |
|---|---|---|
| JP | 06-038400 A | 2/1994 |
| JP | 11-341713 A | 12/1999 |
| JP | 2000-013999 A | 1/2000 |
| JP | 2009-027781 A | 2/2009 |

* cited by examiner

*Primary Examiner* — Carlos Amaya
*Assistant Examiner* — Aqeel Bukhari
(74) *Attorney, Agent, or Firm* — NSIP Law

(57) ABSTRACT

An apparatus and a method for wireless power reception are provided. A wireless power receiver includes a receiving unit configured to wirelessly receive a power. The wireless power receiver further includes a power consuming unit configured to consume the power, until a voltage applied to a load reaches a predetermined value, so that an amount of a power transferred from the receiving unit to the load is less than or equal to an initial accommodation power amount of the load.

20 Claims, 20 Drawing Sheets

→ INPUT CURRENT
---→ INDUCED CURRENT

APPARATUS AND METHOD FOR WIRELESS POWER RECEPTION

CROSS-REFERENCE TO RELATED APPLICATION(S)

This application claims the benefit under 35 U.S.C. §119 (a) of Korean Patent Application No. 10-2012-0074900, filed on Jul. 10, 2012, in the Korean Intellectual Property Office, the entire disclosure of which is incorporated herein by reference for all purposes.

BACKGROUND

1. Field

The following description relates to an apparatus and a method for wireless power reception.

2. Description of Related Art

Research on wireless power transmission has been started to overcome an increase in inconveniences of wired power supplies, and the limited capacity of conventional batteries, due to an explosive increase in various electronic devices including electric vehicles, mobile devices, and the like. One of wireless power transmission technologies uses resonance characteristics of radio frequency (RF) devices. For example, a wireless power transmission system using resonance characteristics may include a source device configured to supply a power, and a target device configured to receive the supplied power.

SUMMARY

In one general aspect, there is provided a wireless power receiver including a receiving unit configured to wirelessly receive a power. The wireless power receiver further includes a power consuming unit configured to consume the power, until a voltage applied to a load reaches a predetermined value, so that an amount of a power transferred from the receiving unit to the load is less than or equal to an initial accommodation power amount of the load.

In another general aspect, there is provided a wireless power reception method including wirelessly receiving a power. The wireless power reception method further includes consuming the power, until a voltage applied to a load reaches a predetermined value, so that an amount of a power transferred from a receiving unit to the load is less than or equal to an initial accommodation power amount of the load.

Other features and aspects will be apparent from the following detailed description, the drawings, and the claims.

Figure 1:
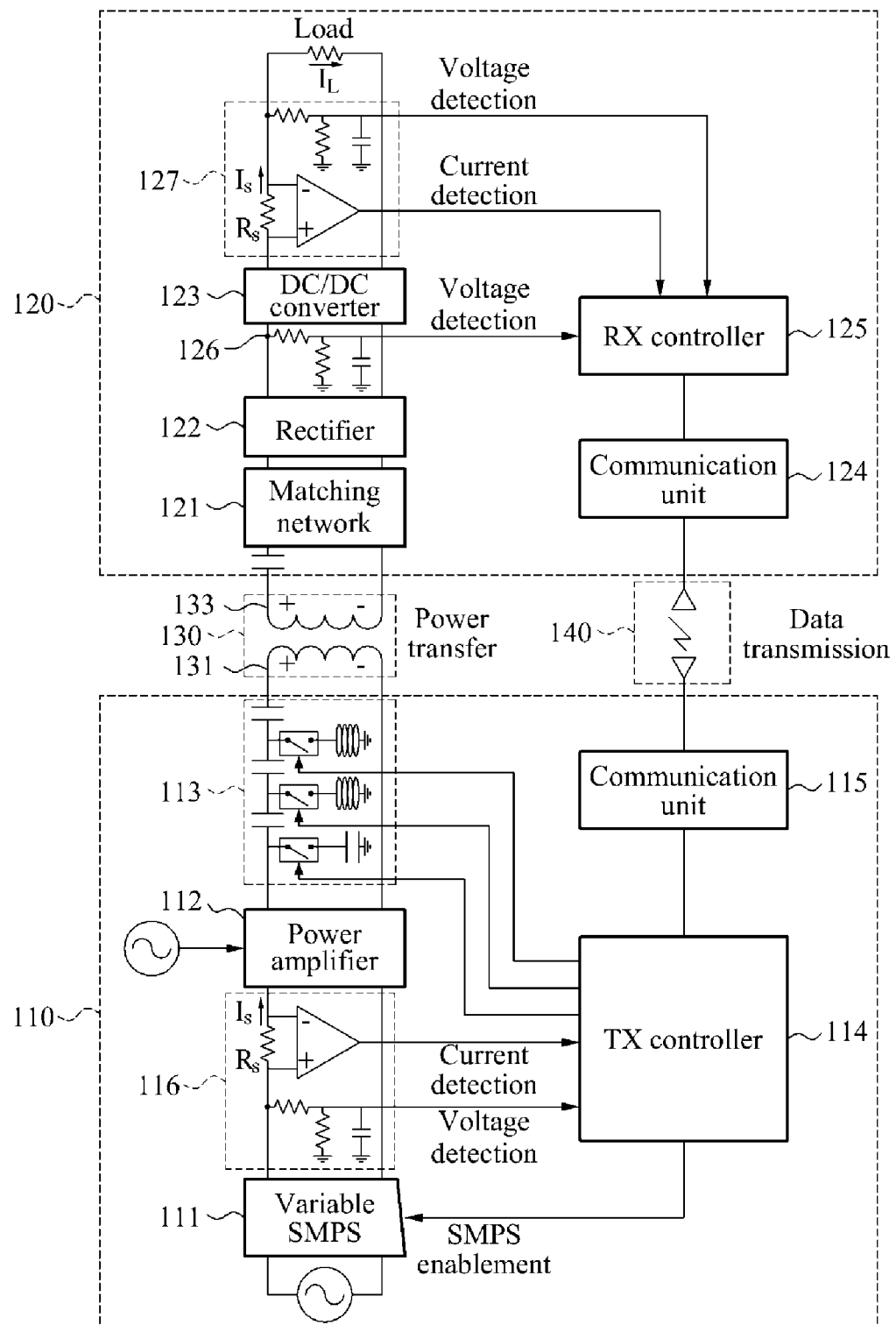
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

A scheme of performing communication between a source device and a target device may include an in-band communication scheme and an out-band communication scheme. The in-band communication scheme means communication performed between the source device and the target device in the same frequency band as used for power transmission. The out-band communication scheme means communication performed between the source device and the target device in a separate frequency band, different from the frequency band used for power transmission.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) controller 114 (e.g., a TX control logic), a communication unit 115, a power detector 116, and a source resonator 131. The target device 120 includes a matching network 121, a rectifier 122, a direct current-to-direct current (DC/DC) converter 123, a communication unit 124, a reception (RX) controller 125 (e.g., a RX control logic), a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the controller 114.

The variable SMPS 111 may control the DC voltage based on a level of power output from the power amplifier 112 so that the power amplifier 112 may operate in a saturation region with high efficiency at all times, and may enable a maximum efficiency to be maintained at all levels of the output power. The power amplifier 112 may include class-E features.

For example, when a common SMPS is used instead of the variable SMPS 111, a variable DC/DC converter may need to be additionally used. In this example, the common SMPS and the variable DC/DC converter may control the DC voltage based on the level of the power output from the power amplifier 112 so that the power amplifier 112 may operate in the saturation region with high efficiency at all times, and may enable the maximum efficiency to be maintained at all levels of the output power.

The power detector 116 detects an output current and an output voltage of the variable SMPS 111, and provides, to the controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The controller 114 may detect a reflected wave of the communication power or a reflected wave of the charging power, and may detect mismatching between the target resonator 133 and the source resonator 131 based on the detected reflected wave. The controller 114 may detect the mismatching by detecting an envelope of the reflected wave, or by detecting an amount of a power of the reflected wave.

Under the control of the controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the controller 114 through a switch, which is under the control of the controller 114.

The controller 114 may calculate a voltage standing wave ratio (VSWR) based on a voltage level of the reflected wave and a level of an output voltage of the source resonator 131 or the power amplifier 112. When the VSWR is greater than a predetermined value, the controller 114 detects the mismatching. In this example, the controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the controller 114 may control a frequency of the switching pulse signal used by the power amplifier 112. By controlling the switching pulse signal used by the power amplifier 112, the controller 114 may generate a modulation signal to be transmitted to the target device 120. In other words, the communication unit 115 may transmit various messages to the target device 120 via in-band communication. Additionally, the controller 114 may detect a reflected wave, and may demodulate a signal received from the target device 120 through an envelope of the reflected wave.

The controller 114 may generate a modulation signal for in-band communication using various schemes. To generate a modulation signal, the controller 114 may turn on or off the switching pulse signal used by the power amplifier 112, or may perform delta-sigma modulation. Additionally, the controller 114 may generate a pulse-width modulation (PWM) signal having a predetermined envelope.

The controller 114 determines an initial wireless power to be transmitted to the target device 120 based on a change in a temperature of the source device 110, a battery state of the target device 120, a change in an amount of a power received at the target device 120, and/or a change in a temperature of the target device 120. The source device 110 may further include a temperature measurement sensor (not illustrated) configured to detect the change in the temperature of the source device 110. The source device 110 may receive, from the target device 120, information on the battery state of the target device 120, the change in the amount of the power received at the target device 120, and/or the change in the temperature of the target device 120. The source device 110 may detect the change in the temperature of the target device 120 based on data received from the target device 120.

The controller 114 adjusts a voltage supplied to the PA 112 based on a lookup table. The lookup table may store an amount of the voltage to be adjusted based on the change in the temperature of the source device 110. For example, if the temperature of the source device 110 rises, the controller 114 may lower the voltage supplied to the PA 112.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The target resonator 133 receives, from the source device 110, the initial wireless power determined based on the change in the temperature of the source device 110, the battery state of the target device 120, the change in the amount of the power received at the target device 120, and/or the change in the temperature of the target device 120.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the controller 125. The controller 125 uses the detected voltage of the input terminal 126 to compute a transmission efficiency of power received from the source device 110. Additionally, the controller 125 uses the detected current and the detected voltage of the output terminal to compute an amount of power transferred to the load. The controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the controller 125 may demodulate a message received via the in-band communication.

Additionally, the controller 125 may adjust an impedance of the target resonator 133 to modulate a signal to be transmitted to the source device 110. For example, the controller 125 may increase the impedance of the target resonator so that a reflected wave will be detected by the controller 114 of the source device 110. In this example, depending on whether the reflected wave is detected, the controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

Figure 2:
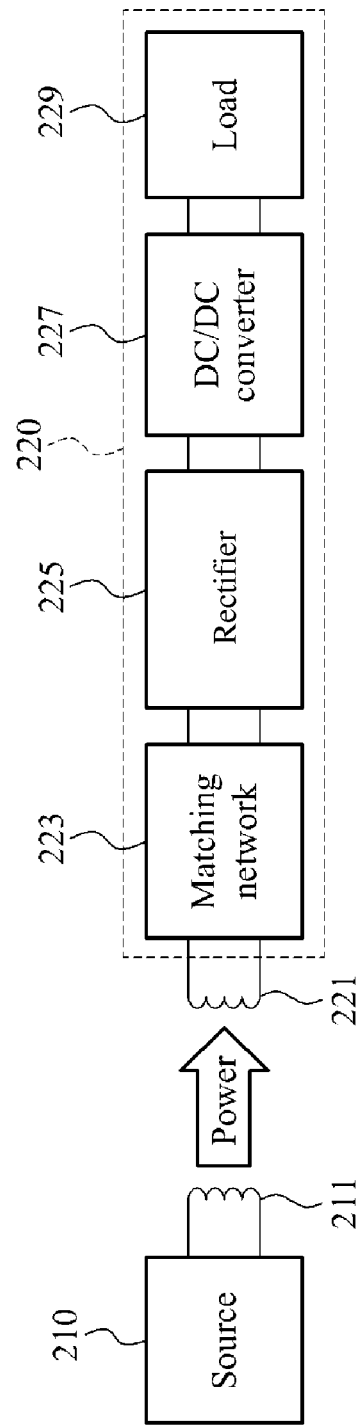
FIG. 2 is a block diagram illustrating another example of a wireless power transmission system.

FIG. 2 is a block diagram illustrating another example of a wireless power transmission system. Referring to FIG. 2, the wireless power transmission system includes a source device 210 and a target device 220. The source device 210 wirelessly transmits a power to the target device 220 through mutual resonance between a source resonator 211 of the source device 210, and a target resonator 221 of the target device 220.

To efficiently receive the power from the source device 210, the target device 220 includes a matching network 223. The matching network 223 performs impedance matching between an input terminal and an output terminal of the matching network 223. The matching network 223 may be implemented, for example, as a circuit including a capacitor and an inductor.

Additionally, the target device 220 further includes a rectifier 225, a DC/DC converter 227, and a load 229. The rectifier 225 rectifies (i.e., converts) a received AC signal to a DC signal. For example, the received AC signal may be the power received by the target resonator 221 through the mutual resonance. The DC/DC converter 227 converts (i.e., drops or raises) a magnitude of a voltage of the DC signal to a magnitude of a voltage that is required by the load 229. The load 229 may include, for example, a TV, a refrigerator, a mobile terminal, a battery charger, and/or a battery that may be charged and operated using a power in real-time.

The target device 220 may include, for example, an electric vehicle. The source device 210 may charge the electric vehicle in a lower portion or an upper portion of the electric vehicle.

Figure 3:
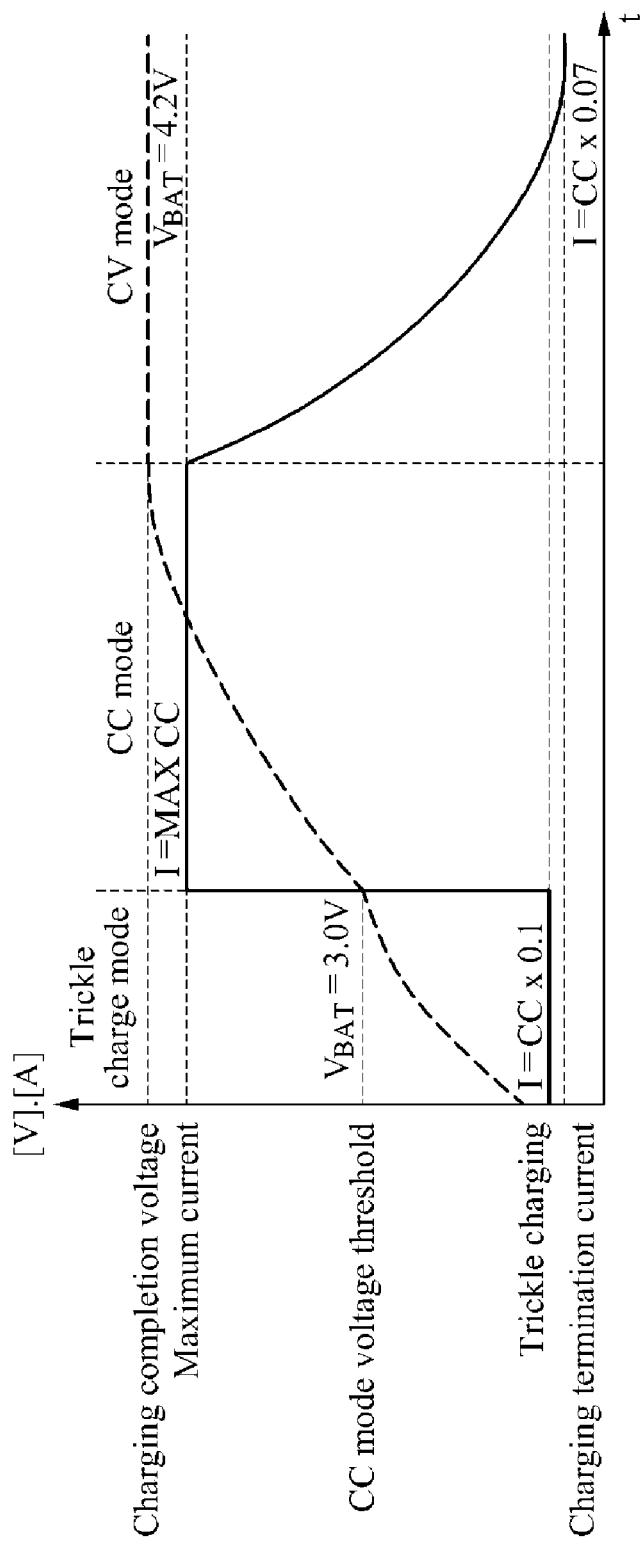
FIG. 3 is a graph illustrating an example of a charging profile of a lithium polymer battery.

FIG. 3 is a graph illustrating an example of a charging profile of a lithium polymer battery. In more detail, the graph of FIG. 3 illustrates a profile of a charging voltage ($V_{BAT}$) applied to the lithium polymer battery (dashed line) over time, and a charging current (I) supplied to the lithium polymer battery (solid line) over time. The lithium polymer battery, hereinafter referred to as a battery, may be used as a battery of a typical portable electronic device.

Referring to FIG. 3, the charging current supplied to the battery during an initial charging of the battery may include, for example, a value of about 0 milliamperes (mA), and then, the battery is trickle-charged in a trickle charge mode. For example, the charging current supplied to the battery during the trickle charging of the battery may include, for example, an extremely small value of about 50 mA, e.g., a constant current (CC) multiplied by 0.1. In the trickle charge mode, the charging voltage applied to the battery increases.

When the charging voltage applied to the battery becomes greater than or equal to a predetermined level (i.e., a CC mode voltage threshold), during the trickle charging of the battery, the battery is charged in a CC mode. For example, in the CC mode, the charging current supplied to the battery may include, for example, a value of about 500 mA, e.g., a maximum (MAX) CC. The predetermined level of the charging voltage that is required to enter the CC mode may be set to, for example, a value of about 3 V. The predetermined level may be set based on a type and a capacity of the battery. In the CC mode, the charging voltage further increases.

When the charging voltage applied to the battery becomes greater than or equal to another predetermined level (i.e., a charging completion voltage), during the charging of the battery, the battery is charged in a constant voltage (CV) mode. For example, in the CV mode, the charging current supplied to the battery is gradually decreased. The other predetermined level of the charging voltage that is required to enter the CV mode may be set to, for example, a value of about 4.2 V. The other predetermined level refers to a value of the charging voltage required to complete the charging of the battery.

When the charging current supplied to the battery becomes less than or equal to a value of a charging termination current (e.g., the CC multiplied by 0.07), during the charging of the battery, the battery is completely-charged. Accordingly, the charging of the battery is terminated.

In the wireless power transmission system, during the initial charging of the battery, an extremely small amount of the charging current, for example about 0 mA or 50 mA, is supplied to the battery. However, an amount of a power received via a target resonator may be significantly greater than an amount of a power that may be accommodated in the battery. If the power received via the target resonator is supplied to the battery without a change, a large amount of a current, for example about 500 mA, may be supplied to the battery.

To normally charge the battery, all remaining power obtained by excluding the power that may be accommodated in the battery from a power received in a signal processing terminal between the target resonator and the battery, may need to be consumed, since the amount of the power that may be accommodated in the battery may be extremely small compared to the large amount of the received power. The signal processing terminal may include, for example, a rectifier and a DC/DC converter.

A power P equals a voltage V multiplied by a current I. Since the amount of the charging current supplied to the battery during the initial charging of the battery may be limited to a range of about 0 mA to about 50 mA, an output voltage of a rectifier or a DC/DC converter may be significantly increased to consume the remaining power. The output voltage may become greater than or equal to an allowable voltage of an element forming the rectifier or the DC/DC converter, and may influence the element, so that an operation of the signal processing terminal may be affected.

Additionally, a small amount of a standby power may be set in an application, for example a TV, which receives a power in real-time without an internal battery. When the wireless power transmission system is applied to the application, a power between a target resonator and the application may need to be consumed in an interval in which the power is supplied to the application.

Figure 4:
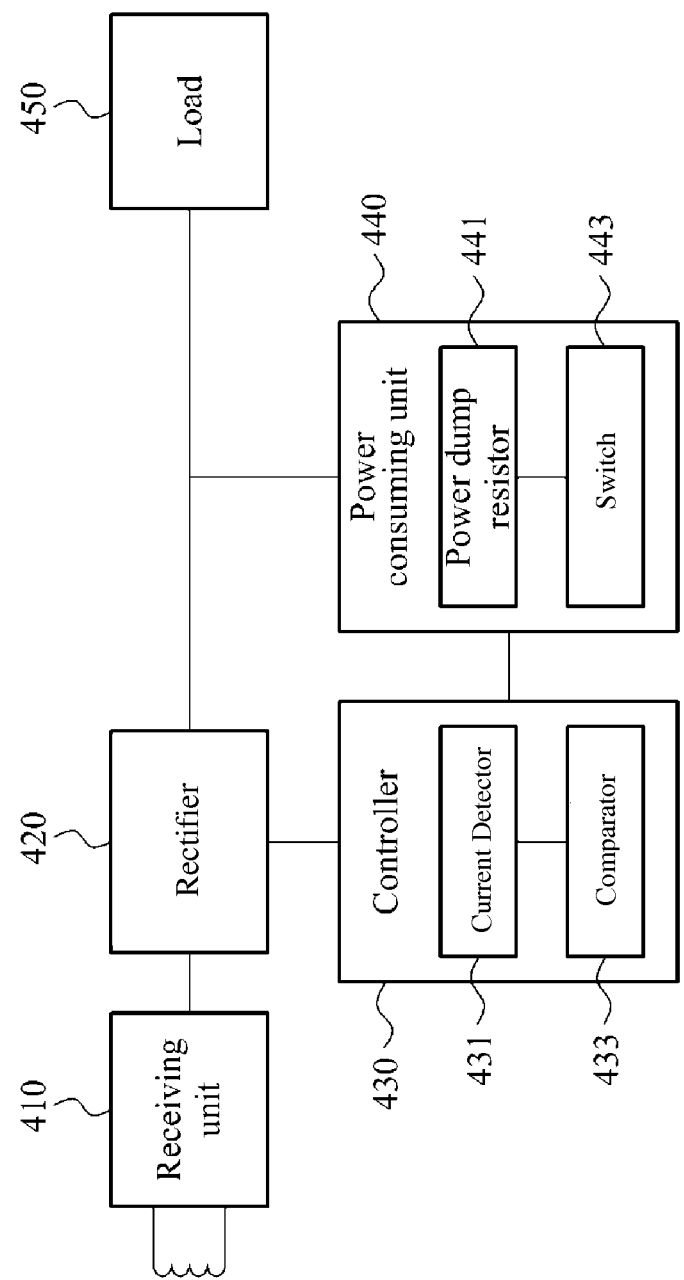
FIG. 4 is a block diagram illustrating an example of a wireless power receiver.

FIG. 4 is a block diagram illustrating an example of a wireless power receiver. Referring to FIG. 4, the wireless power receiver (i.e., a target device) includes a receiving unit 410, a rectifier 420, a controller 430, and a power consuming unit 440. The wireless power receiver may include a load 450 as a basic component, or as a detachable component, depending on circumstances.

The receiving unit 410 wirelessly receives a power through mutual resonance between a source resonator of a wireless power transmitter (i.e., a source device) and a target resonator of the receiving unit 410. For example, the mutual resonance may occur when a resonant frequency band of the source resonator is identical to a resonant frequency band of the target resonator. The mutual resonance may be a magnetic resonance, and may be affected by mutual inductance between the source resonator and the target resonator.

The rectifier 420 rectifies a received AC signal to a DC signal. The received AC signal may be the power received via the target resonator through the mutual resonance, and may be a radio frequency (RF) signal.

The controller 430 controls an operation of the power consuming unit 440, based on a magnitude of a voltage of the DC signal output from the rectifier 420. When the magnitude of the voltage of the DC signal is less than a predetermined value, the controller 430 controls the power consuming unit 440 to be operated, or controls the operation of the power consuming unit 440 to be maintained. When the magnitude of the voltage of the DC signal is greater than or equal to the predetermined value, the controller 430 controls the power consuming unit 440 to be suspended. The predetermined value may be set to, for example, a value of a voltage measured when charging of a battery (i.e., the load 450) is started in a CC mode, or a value of a voltage measured when a power is started to be supplied to an application, for example a TV, in the CC mode.

For example, a CC mode voltage threshold may be set to 3 V. When the magnitude of the DC signal is less than 3 V, the controller 430 controls the power consuming unit 440 to be operated, or controls the operation of the power consuming unit 440 to be maintained. When the magnitude of the DC signal is greater than or equal to 3 V, the controller 430 controls the power consuming unit 440 to be suspended.

The controller 430 includes a current detector 431 and a comparator 433. The current detector 431 detects a current of the DC signal output from the rectifier 420. In an example, the current detector 431 may calculate a value of the current from a voltage applied to both ends of a resistor connected to a rear end of the rectifier 420. In another example, the current detector 431 may be connected to the rear end of the rectifier 420, and may calculate the value of the current from a voltage applied to a measurement resistor included in the current detector 431.

The comparator 433 compares the value of the current detected by the current detector 431 with a value of a predetermined reference current, that is, compares the detected current with the predetermined reference current. When the detected current is less than the predetermined reference current, the comparator 433 outputs a high signal. When the detected current is greater than or equal to the predetermined reference current, the comparator 433 outputs a low signal. The value of the predetermined reference current may be set to, for example, a value of a current measured when the charging of the battery is started in the CC mode, or a value of a current measured when the power is started to supplied to the application in the CC mode. The high signal may include a digital signal '1', and the low signal may include a digital signal '0'.

When the high signal is output from the comparator 433, the controller 430 controls the power consuming unit 440 to be operated. When the low signal is output from the comparator 433, the controller 430 controls the power consuming unit 440 to be suspended.

The power consuming unit 440 is located at the rear end of the rectifier 420. The power consuming unit 440 consumes a power received from the receiving unit 410, until a voltage applied to the load 450 (e.g., the voltage of the DC signal) reaches the predetermined value, so that an amount of a power transferred from the receiving unit 410 to the load 450 is less than or equal to an initial accommodation power amount of the load 450. The predetermined value may be set to, for example, the value of the voltage measured when the charging of the battery is started in the CC mode, or the value of the voltage measured when the power is started to be supplied to the application in the CC mode. The initial accommodation power amount of the load 450 refers to an amount of a power that may be initially-accommodated in the load 450. The initial accommodation power amount of the load 450 may be determined based on a value of a current that may be accommodated in the load 450 when charging of the load 450 is started. For example, if the load 450 is a battery, the initial accommodation power amount of the load 450 refers to an amount of a power that may be accommodated in the battery in a trickle charge mode.

The power consuming unit 440 includes a power dump resistor 441 and a switch 443. The power dump resistor 441 may include a value of a resistance that is in inverse proportion to the initial accommodation power amount of the load 450. That is, as the initial accommodation power amount of the load 450 increases, the power dump resistor 441 may include a smaller value of the resistance. The power dump resistor 441 is located between the rectifier 420 and the load 450, and consumes a power output from the rectifier 420. Based on a size of the power dump resistor 441, an amount of the power to be consumed by the power dump resistor 441 may be adjusted. The size of the power dump resistor 441 may be variably-adjusted.

The switch 443 enables the power dump resistor 441 to be operated or suspended. For example, the switch 443 may enable the power dump resistor 441 and the rectifier 420 to be electrically-connected or electrically-disconnected. The switch 443 is operated based on the high or low signal output from the controller 430, namely, the comparator 433.

For example, the switch 443 may include a transistor. The transistor may be powered on or off based on a magnitude of a voltage applied to the transistor. When the high signal output from the comparator 433 is applied to the transistor, the transistor is powered on. When the low signal output from the comparator 433 is applied to the transistor, the transistor is powered off. The high signal may include a magnitude of the voltage that is greater than a minimum voltage required to turn on the transistor, and the low signal may include a magnitude of the voltage that is less than the minimum voltage.

The controller 430 may perform an overall control of the wireless power receiver of FIG. 4, and may perform functions of the receiving unit 410, the rectifier 420, and the power consuming unit 440. The receiving unit 410, the rectifier 420, the controller 430, and the power consuming unit 440 are separately illustrated in FIG. 4 to separately describe each respective function. Thus, to implement a product, the controller 430 may perform all of the functions, or may perform a portion of the functions.

Figure 5:
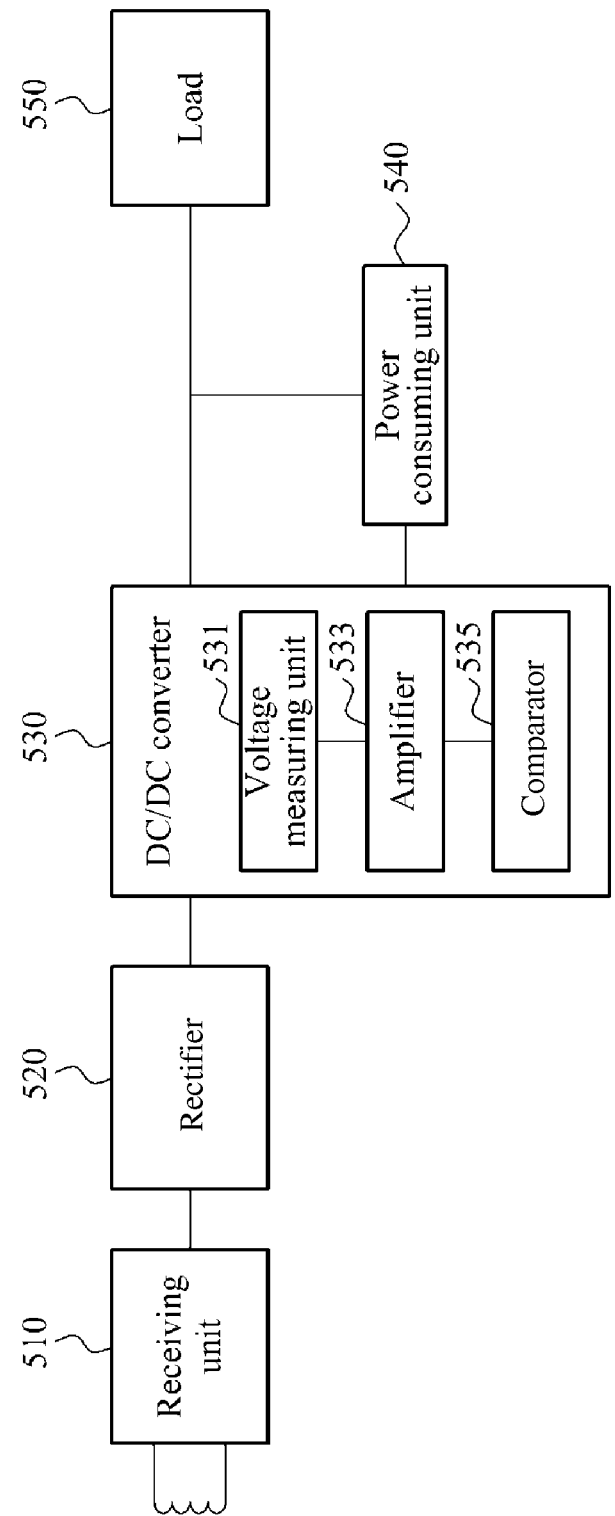
FIG. 5 is a block diagram illustrating another example of a wireless power receiver.

FIG. 5 is a block diagram illustrating another example of a wireless power receiver. Referring to FIG. 5, the wireless power receiver (i.e., a target device) includes a receiving unit 510, a rectifier 520, a DC/DC converter 530, and a power consuming unit 540. The wireless power receiver may include a load 550 as a basic component, or as a detachable component, depending on circumstances.

The receiving unit 510 wirelessly receives a power through mutual resonance between a source resonator of a wireless power transmitter (i.e., a source device) and a target resonator of the receiving unit 510. For example, the mutual resonance may occur when a resonant frequency band of the source resonator is identical to a resonant frequency band of the target resonator. The mutual resonance may be a magnetic resonance, and may be affected by mutual inductance between the source resonator and the target resonator.

The rectifier 520 rectifies a received AC signal to a DC signal. The received AC signal may be the power received via the target resonator through the mutual resonance, and may be an RF signal.

The DC/DC converter 530 converts a magnitude of a voltage of the DC signal output from the rectifier 520 to a magnitude of a voltage that is required by the load 550. For example, the DC/DC converter 530 may convert the magnitude of the rectified DC voltage to a magnitude of a rated voltage of the load 550. If the magnitude of the rated voltage is 5 V, the DC/DC converter 530 may convert the magnitude of the rectified DC voltage to 5 V.

The DC/DC converter 530 includes a voltage measuring unit 531, an amplifier 533, and a comparator 535. The voltage measuring unit 531 measures a voltage applied to an on-resistor of a transistor connected in series to the rectifier 520. In more detail, the transistor functions as a switch. For example, the transistor may include an n-channel metal-oxide-semiconductor (NMOS) transistor that performs an on/off operation of a switch based on a magnitude of a voltage applied to a gate of the transistor. The on-resistor may include, for example, a value of a resistance of the transistor that is measured when the transistor is turned on.

The amplifier 533 amplifies the voltage measured by the voltage measuring unit 531. For example, the measured voltage may include a value less than a value of a predetermined reference voltage of the comparator 535. In this example, the amplifier 533 amplifies the measured voltage to a value comparable to the value of the predetermined reference voltage. For example, if the predetermined reference voltage and the measured voltage are 4.2 V and 300 mV, respectively, the amplifier 533 may amplify the measured voltage about ten times.

The comparator 535 compares the amplified voltage with the predetermined reference voltage. When the amplified voltage is less than the predetermined reference voltage, the comparator 535 outputs a high signal. When the amplified voltage is greater than or equal to the predetermined reference voltage, the comparator 535 outputs a low signal. The value of the predetermined reference voltage may be set to, for example, a value of a voltage measured when charging of a battery is started in a CC mode, or a value of a voltage measured when a power is started to be supplied to an application, for example a TV, in the CC mode.

When the high signal is output from the comparator 535, the DC/DC converter 530 controls an operation of the power consuming unit 540 to be started or maintained. When the low signal is output from the comparator 535, the DC/DC converter 530 controls the operation of the power consuming unit 540 to be suspended.

The power consuming unit 540 is located at a rear end of the DC/DC converter 530. The power consuming unit 540 consumes a power received from the DC/DC converter 530 so that an amount of the power transferred from the DC/DC converter 530 to the load 550 is less than or equal to an initial accommodation power amount of the load 550. The initial accommodation power amount of the load 550 may be determined based on a value of a current that may be accommodated in the load 550 when charging of the load 550 is started. For example, if the load 550 is a battery, the initial accommodation power amount of the load 550 refers to an amount of a power that may be accommodated in the battery in a trickle charge mode.

Figure 6:
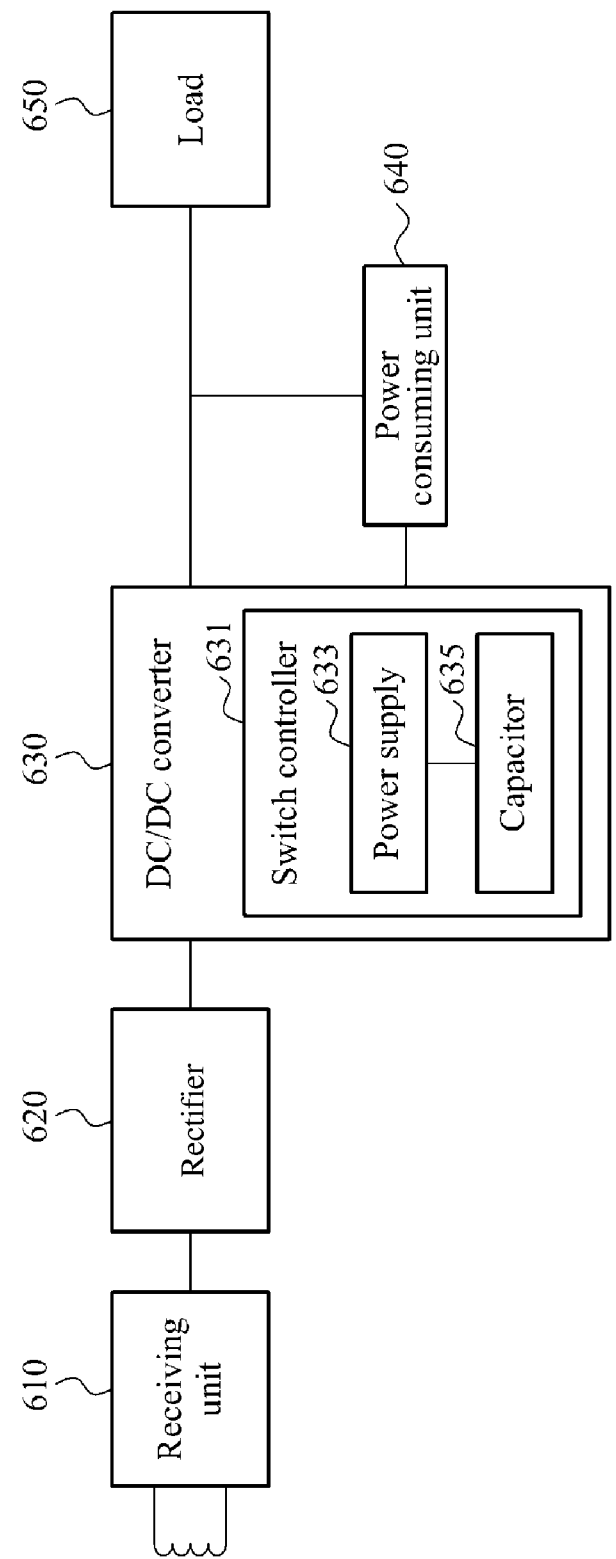
FIG. 6 is a block diagram illustrating still another example of a wireless power receiver.

FIG. 6 is a block diagram illustrating still another example of a wireless power receiver. Referring to FIG. 6, the wireless power receiver (i.e., a target device) includes a receiving unit 610, a rectifier 620, a DC/DC converter 630, and a power consuming unit 640. The wireless power receiver may include a load 650 as a basic component, or as a detachable component, depending on circumstances.

The receiving unit 610 wirelessly receives a power through mutual resonance between a source resonator of a wireless power transmitter (i.e., a source device) and a target resonator of the wireless power receiver. For example, the mutual resonance occurs when a resonant frequency band of the source resonator is identical to a resonant frequency band of the target resonator. The mutual resonance may be a magnetic resonance, and may be affected by mutual inductance between the source resonator and the target resonator.

The rectifier 620 rectifies a received AC signal to a DC signal. The received AC signal may be the power received via the target resonator through the mutual resonance, and may be an RF signal.

The DC/DC converter 630 converts a magnitude of a voltage of the DC signal output from the rectifier 620 to a magnitude of a voltage that is required by the load 650. For example, the DC/DC converter 630 may convert the magnitude of the rectified DC voltage to a magnitude of a rated voltage of the load 650. If the magnitude of the rated voltage is 10 V, the DC/DC converter 630 may convert the magnitude of the rectified DC voltage to 10 V.

The DC/DC converter 630 includes a switch controller 631. The switch controller 631 includes a power supply 633 and a capacitor 635. The switch controller 631 controls an operation switch of the power consuming unit 640 based on a magnitude of a voltage applied to the capacitor 635 when the receiving unit 610 receives the power.

In more detail, when the receiving unit 610 receives the power, the capacitor 635 stores the power. As an amount of the power stored in the capacitor 635 increases, the magnitude of the voltage applied to the capacitor 635 increases.

When the magnitude of the voltage applied to the capacitor 635 is less than or equal to a predetermined value, the switch controller 631 powers on the operation switch of the power consuming unit 640, so that the power consuming unit 640 is operated. When the magnitude of the voltage applied to the capacitor 635 is greater than the predetermined value, the switch controller 631 powers off the operation switch of the power consuming unit 640 to suspend an operation of the power consuming unit 640. The predetermined value may be set to, for example, a value of a voltage measured when charging of a battery is started in a CC mode, or a value of a voltage measured when a power is started to be supplied to an application, for example a TV, in the CC mode.

The power supply 633 supplies a constant amount of a current to the capacitor 635 when the receiving unit 610 receives the power. That is, when the receiving unit 610 receives the power, the power supply 633 is operated. For example, the power supply 633 may be a current source.

The capacitor 635 stores the current supplied from the power supply 633. As the amount of the power stored in the capacitor 635 increases, the magnitude of the voltage applied to the capacitor 635 increases. When the magnitude of the voltage applied to the capacitor 635 is less than or equal to the predetermined value, the switch controller 631 powers on the operation switch of the power consuming unit 640, so that the power consuming unit 640 is operated. When the magnitude of the voltage applied to the capacitor 635 is greater than the predetermined value, the switch controller 631 powers off the operation switch of the power consuming unit 640 to suspend an operation of the power consuming unit 640.

The power consuming unit 640 is located at a rear end of the DC/DC converter 630. The power consuming unit 640 consumes a power received from the DC/DC converter 630 to that an amount of a power transferred from the DC/DC converter 630 to the load 650 is less than or equal to an initial accommodation power amount of the load 650.

The initial accommodation power amount of the load 650 may be determined based on a value of a current that may be accommodated in the load 650 when charging of the load 650 is started. For example, if the load 650 is a battery, the initial accommodation power amount refers to an amount of a power that may be accommodated in the battery in a trickle charge mode.

Figure 7:
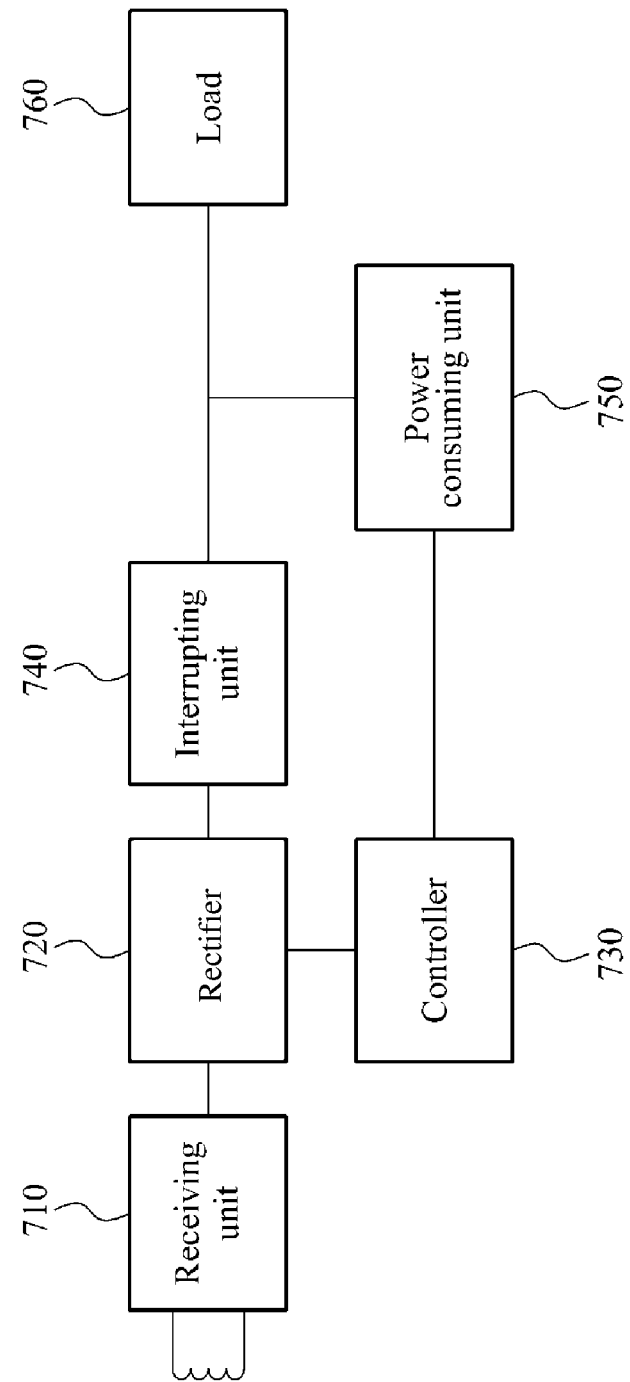
FIG. 7 is a block diagram illustrating yet another example of a wireless power receiver.

FIG. 7 is a block diagram illustrating yet another example of a wireless power receiver. Referring to FIG. 7, the wireless power receiver (i.e., a target device) includes a receiving unit 710, a rectifier 720, a controller 730, an interrupting unit 740, and a power consuming unit 750. The wireless power receiver may include a load 760 as a basic component, or as a detachable component, depending on circumstances.

The receiving unit 710 wirelessly receives a power through mutual resonance between a source resonator of a wireless power transmitter (e.g., a source device) and a target resonator of the wireless power receiver. For example, the mutual resonance may occur when a resonant frequency band of the source resonator is identical to a resonant frequency band of the target resonator. The mutual resonance may be a magnetic resonance, and may be affected by mutual inductance between the source resonator and the target resonator.

The rectifier 720 rectifies a received AC signal to a DC signal. The received AC signal may be the power received via the target resonator through the mutual resonance, and may be an RF signal.

The controller 730 controls an operation of the power consuming unit 750 based on a magnitude of a voltage of the DC signal output from the rectifier 720. When the magnitude of the voltage of the DC signal is less than a predetermined value, the controller 730 controls the power consuming unit 750 to be operated. When the magnitude of the voltage of the DC signal is greater than or equal to the predetermined value, the controller 730 controls the power consuming unit 750 to be suspended. The predetermined value may be set to, for example, a value of a voltage measured when charging of a battery is started in a CC mode, or to a value of a voltage measured when a power is started to be supplied to an application, for example a TV, in the CC mode.

For example, a CC mode voltage threshold may be set to 3 V. When the magnitude of the voltage of the DC signal is less than 3 V, the controller 730 controls the power consuming unit 750 to be operated, or controls the operation of the power consuming unit 750 to be maintained. When the magnitude of the voltage of the DC signal is greater than or equal to 3 V, the controller 730 controls the power consuming unit 750 to be suspended.

The interrupting unit 740 interrupts an electrical connection between the rectifier 720 and the load 760 based on the magnitude of the voltage of the DC signal output from the rectifier 720. When the magnitude of the voltage of the DC signal is greater than a magnitude of a voltage that is allowed in the load 760, the interrupting unit 740 interrupts the electrical connection between the rectifier 720 and the load 760. For example, if a magnitude of a rated voltage of the load 760 is 5 V, and the magnitude of the rectified DC voltage is greater than 5 V, the interrupting unit 740 interrupts the electrical connection between the rectifier 720 and the load 760. The interrupting unit 740 may control a switch, and may open the switch to interrupt the electrical connection between the rectifier 720 and the load 760.

The power consuming unit 750 is located at a rear end of the rectifier 720. The power consuming unit 750 consumes a power received from the receiving unit 710, until a voltage applied to the load 760 (e.g., the voltage of the DC signal) reaches the predetermined value, so that an amount of a power transferred from the receiving unit 710 to the load 760 is less than or equal to an initial accommodation power amount of the load 760. The predetermined value may be set to, for example, the value of the voltage measured when the charging of the battery is started in the CC mode, or the value of the voltage measured when the power is started to be supplied to the application in the CC mode. The initial accommodation power amount of the load 760 may be determined based on a value of a current that may be accommodated in the load 760 when charging of the load 760 is started. For example, if the load 760 is a battery, the initial accommodation power amount refers to an amount of a power that may be accommodated in the battery in a trickle charge mode.

Figure 8:
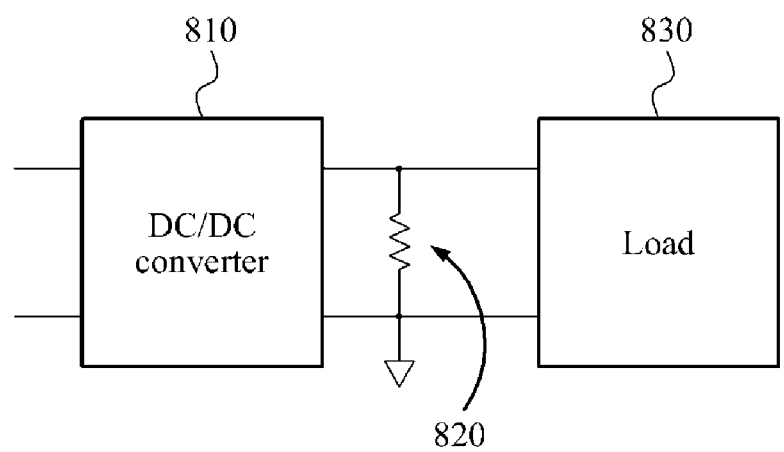
FIG. 8 is a diagram illustrating an example of a power consuming unit of a wireless power receiver.

FIG. 8 is a diagram illustrating an example of a power consuming unit of a wireless power receiver. Referring to FIG. 8, the wireless power receiver may be protected by a power dump resistor 820. For example, when charging of a battery is started, or when a power is transmitted to an apparatus that may be operated in real-time, for example a TV, all power output from a DC/DC converter 810 may not be accommodated in a load 830. The power dump resistor 820 consumes the power output from the DC/DC converter 810.

For example, a power of 3 W may be initially-supplied to the DC/DC converter 810, and an extremely small amount of a power, for example about 0.25 W, may be accommodated in the load 830. Accordingly, a remaining power obtained by excluding 0.25 W from 3 W needs to be consumed as heat or a leakage power at a front end of the load 830. As such, the wireless power receiver may initially transfer the power of 0.25 W to the load 830, and may consume the remaining power of 2.75 W using the power dump resistor 820. Thus, the wireless power receiver is protected.

Figure 9:
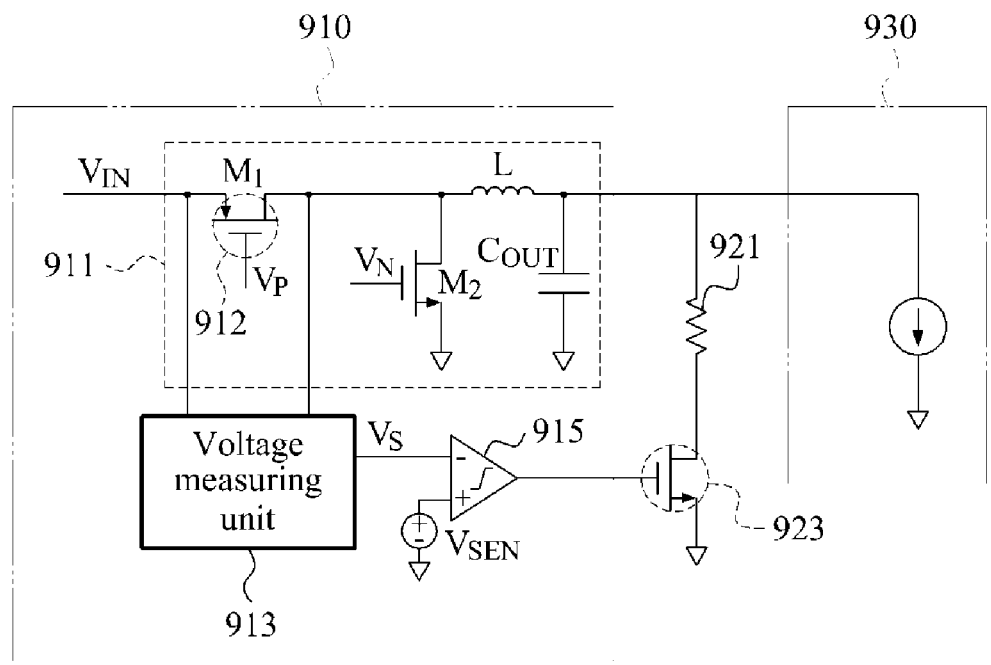
FIG. 9 is a diagram illustrating an example of a direct current (DC)-to-DC (DC/DC) converter of a wireless power receiver.

FIG. 9 is a diagram illustrating an example of a DC/DC converter 910 of a wireless power receiver. Referring to FIG. 9, the DC/DC converter 910 includes a converter 911, a voltage measuring unit 913, and a comparator 915.

The converter 911 converts an input DC voltage $V_{IN}$ to a DC voltage required by a load 930 of the wireless power receiver. The converter 911 includes transistors $M_1$ and $M_2$ including gate voltages $V_P$ and $V_N$, respectively, an inductor L, and a capacitor $C_{OUT}$. The input DC voltage $V_{IN}$ may be a voltage rectified by a rectifier of the wireless power receiver. The load 930 may include, for example, an application that may be operated in real-time, for example a TV, or a battery of a terminal.

The voltage measuring unit 913 measures a voltage $V_S$ applied to both ends of a transistor 912, i.e., the transistor $M_1$. Additionally, the voltage measuring unit 913 may calculate a value of a current flowing in the transistor 912 based on an on-resistor of the transistor 912 and the measured voltage $V_S$.

The measured voltage $V_S$ is input to the comparator 915. The comparator 915 compares the voltage $V_S$ with a reference voltage $V_{SEN}$. When the voltage $V_S$ is greater than the reference voltage $V_{SEN}$, the comparator 915 outputs a high signal. When the voltage $V_S$ is less than or equal to the reference voltage $V_{SEN}$, the comparator 915 outputs a low signal. The reference voltage $V_{SEN}$ may be set to, for example, a value of a voltage measured when the charging of the battery is started in a CC mode, or a value of a voltage measured when a power is started to be supplied to an application, for example a TV, in the CC mode.

The output high or low signal is input to a gate of a transistor 923 of the wireless power receiver that functions as a switch. When the output high signal is input to the gate of the transistor 923, the transistor 923 enables a power dump resistor 921 of the wireless power receiver to be operated. In this example, a magnitude of a voltage of the high signal is greater than a magnitude of a voltage (i.e., a threshold voltage) that is required to turn on the transistor 923. When the output low signal is input to the gate of the transistor 923, the transistor 923 enables an operation of the power dump resistor 921 to be suspended. In this example, a magnitude of a voltage of the low signal is less than the magnitude of the voltage that is required to turn on the transistor 923.

The wireless power receiver may sense an amount of a current supplied to the load 930, and may connect the power dump resistor 921 to an output terminal of the DC/DC converter 910, before the sensed amount of the current is greater than a predetermined amount of a current, so that a portion of a power to be supplied to the load 930 is consumed. The wireless power receiver may disconnect the power dump resistor 921 from the output terminal of the DC/DC converter 910 in a normal charging interval in which the sensed amount of the current is greater than the predetermined amount of the current. Thus, the wireless power receiver may prevent an influence on a transmission efficiency. When the sensed amount of the current is less than or equal to the predetermined amount of the current, the wireless power receiver may reconnect the power dump resistor 921 to the output terminal of the DC/DC converter 910, and may protect the DC/DC converter 910 from an electrical shock.

Figure 10:
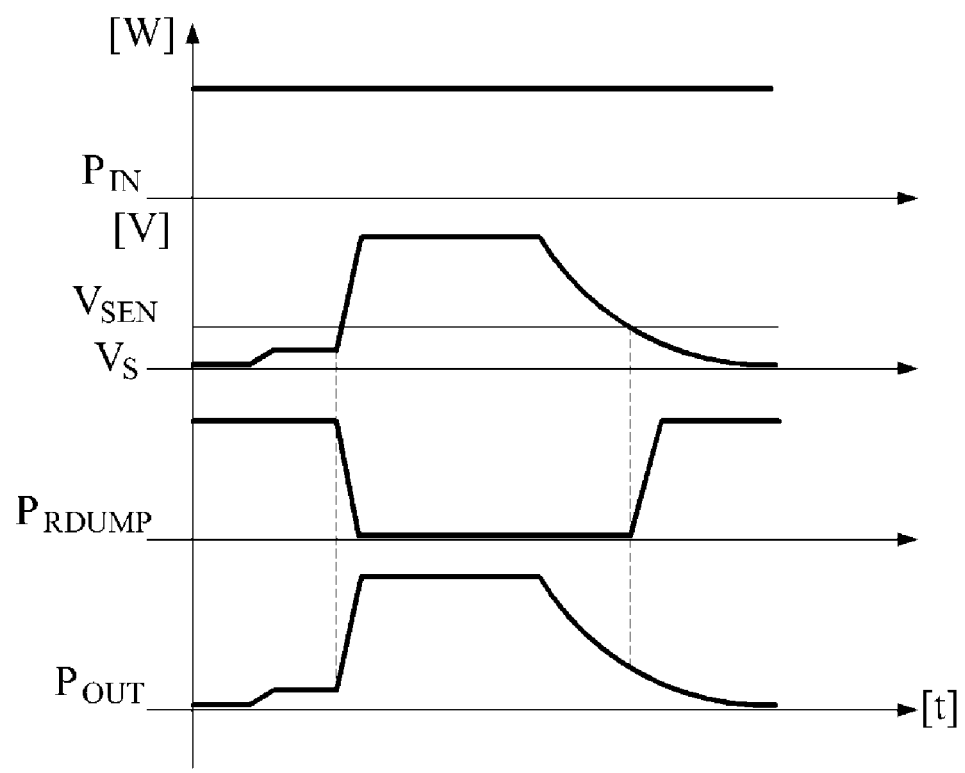
FIG. 10 is a graph illustrating examples of voltages and currents that are measured in the DC/DC converter of FIG. 9.

FIG. 10 is a graph illustrating examples of voltages and currents that are measured in the DC/DC converter 910 of FIG. 9. Referring to FIG. 10, $P_{IN}$ represents a power supplied to the converter 911. In a time interval in which a voltage $V_S$ measured by the voltage measuring unit 913 is less than a reference voltage $V_{SEN}$, the power dump resistor 921 is connected the converter 911, and a power $P_{RDUMP}$ is consumed in the power dump resistor 921. Accordingly, a power $P_{OUT}$ output from the converter 911 is adjusted to a level that may be initially-accommodated in the load 930.

When the voltage $V_S$ becomes greater than the reference voltage $V_{SEN}$, the power dump resistor 921 is disconnected from the converter 911, and the power $P_{RDUMP}$ begins to decrease. Additionally, when the power $P_{RDUMP}$ begins to decrease, the power $P_{OUT}$ begins to increase.

When the voltage $V_S$ becomes less than or equal to the reference voltage $V_{SEN}$, the power dump resistor 921 is reconnected to the converter 911, and the power $P_{RDUMP}$ begins to increase. When the power $P_{RDUMP}$ begins to increase, the power $P_{OUT}$ begins to decrease.

Figure 11:
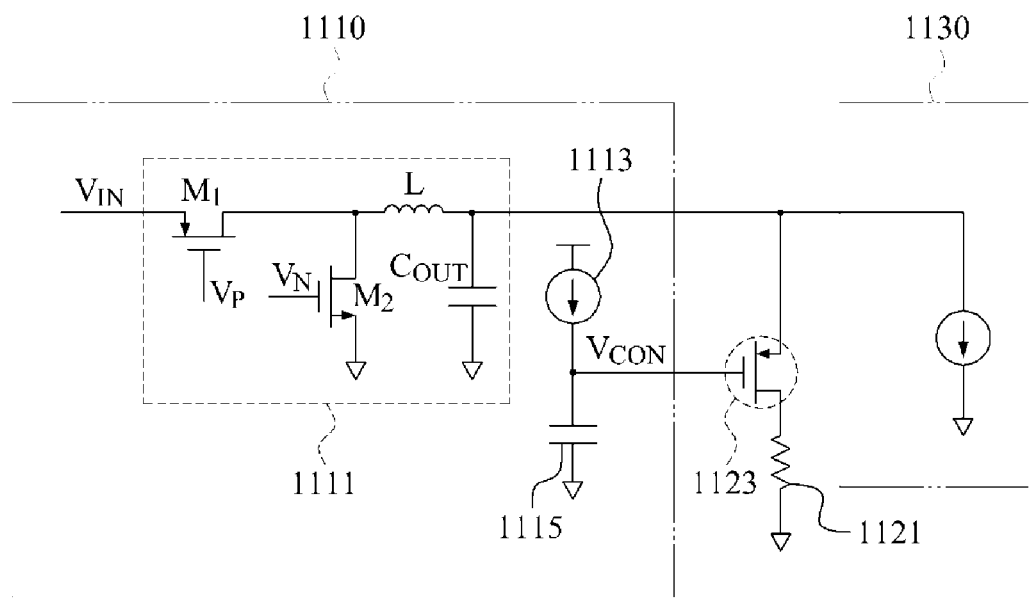
FIG. 11 is a diagram illustrating another example of a DC/DC converter of a wireless power receiver.

FIG. 11 is a diagram illustrating another example of a DC/DC converter 1110 of a wireless power receiver. Referring to FIG. 11, the DC/DC converter 1110 includes a converter 1111, a power supply 1113, and a capacitor 1115.

The converter 1111 converts an input DC voltage $V_{IN}$ to a DC voltage required by a load 1130 of the wireless power receiver. The converter 1111 may include transistors $M_1$ and $M_2$ including gate voltages $V_P$ and $V_N$, respectively, an inductor L, and a capacitor $C_{OUT}$. The input DC voltage $V_{IN}$ may be a voltage rectified by a rectifier of the wireless power receiver. The load 1130 may include, for example, an application that may be operated in real-time, for example a TV, or a battery of a terminal.

The power supply 1113 supplies a current to the capacitor 1115 when the wireless power receiver receives a power, and the capacitor 1115 stores the current as a power. As the power stored in the capacitor 1115 increases, a voltage $V_{CON}$ applied to the capacitor 1115 increases.

The voltage $V_{CON}$ is input to a gate of a transistor 1123 of the wireless power receiver. For example, the transistor 1123 may be a p-channel metal-oxide-semiconductor (PMOS) transistor. When the voltage $V_{CON}$ is less than a voltage required to turn off the transistor 1123, the transistor 1123 is turned on, and connects a power dump resistor 1121 of the wireless power receiver to a rear end of the converter 1111. When the voltage $V_{CON}$ increases to be greater than or equal to the voltage required to turn off the transistor 1123, the transistor 1123 is turned off, and disconnects the power dump resistor 1121 from the rear end of the converter 1111. A maximum value of the voltage $V_{CON}$ may be determined based on a capacitance of the capacitor 1115. The maximum value of the voltage $V_{CON}$ may be set to be greater than or equal to a value of the voltage required to turn off the transistor 1123.

The wireless power receiver connects the power dump resistor 1121 to the converter 1111 to consume an overpower in an initial charging interval, and disconnects the power dump resistor 1121 from the converter 1111 in a normal charging interval. Thus, the wireless power receiver prevents a reduction in a power transmission efficiency.

Figure 12:
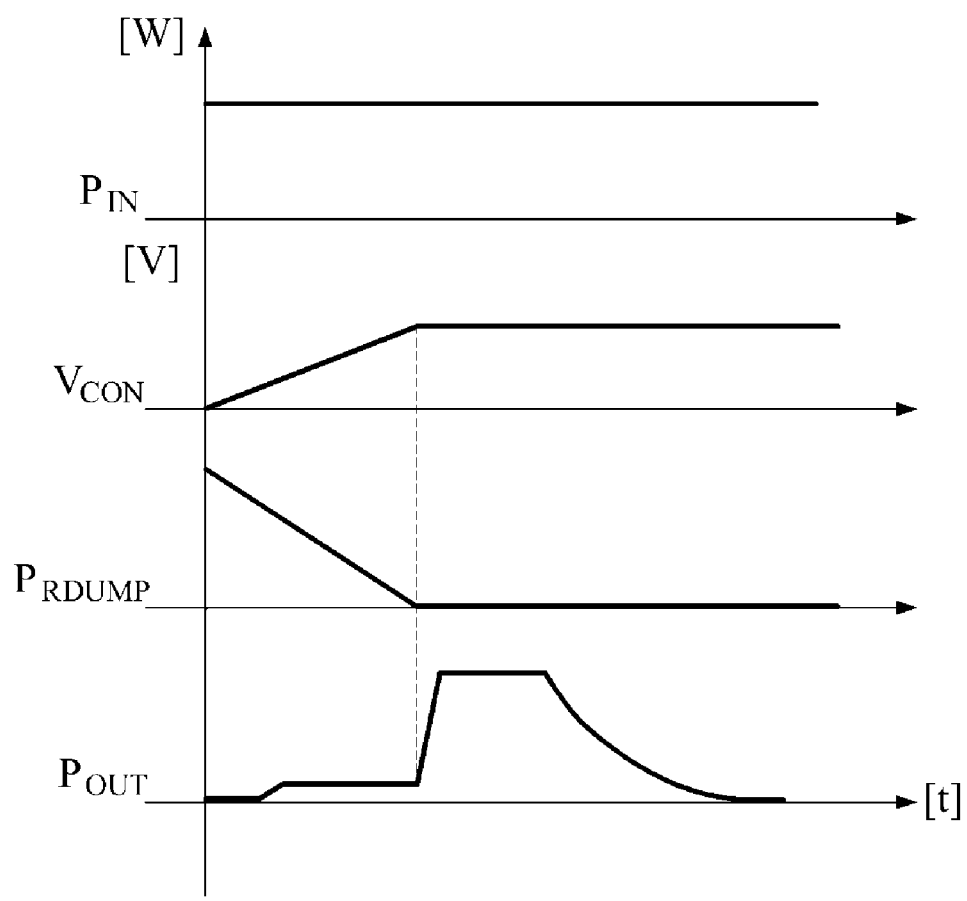
FIG. 12 is a graph illustrating examples of voltages and currents that are measured in the DC/DC converter of FIG. 11.

FIG. 12 is a graph illustrating examples of voltages and currents that are measured in the DC/DC converter 1110 of FIG. 11. Referring to FIG. 12, $P_{IN}$ represents a power supplied to the converter 1111. As a voltage $V_{CON}$ applied to the capacitor 1115 increases, a power $P_{RDUMP}$ consumed in the power dump resistor 1121 decreases. As the power $P_{RDUMP}$ decreases, a power $P_{OUT}$ output from the converter 1111 is adjusted to a level that may be initially-accommodated in the load 1130.

The power $P_{RDUMP}$ is consumed in the power dump resistor 1121 until the transistor 1123 is turned off by the voltage $V_{CON}$ to disconnect the power dump resistor 1121 from the converter 1111. Accordingly, the power $P_{OUT}$ increases.

Figure 13:
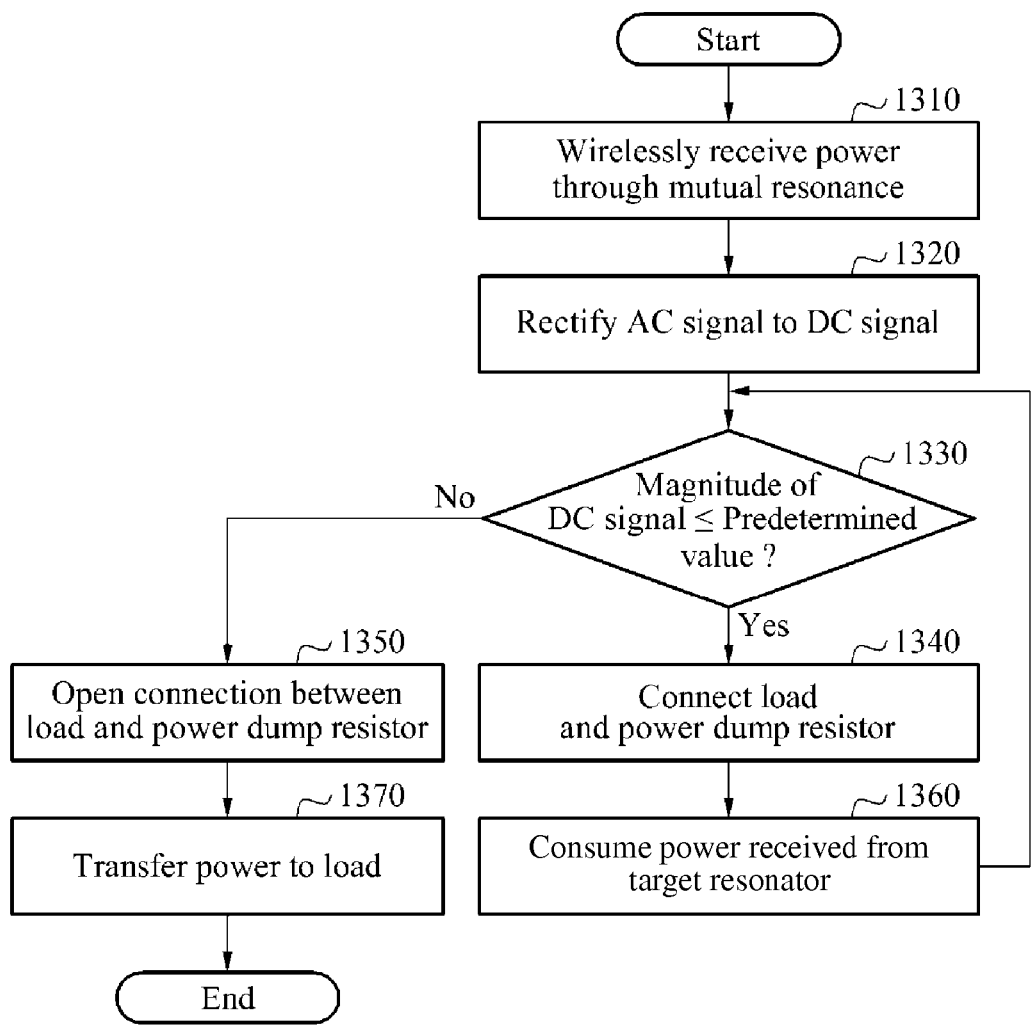
FIG. 13 is a flowchart illustrating an example of a wireless power reception method.

FIG. 13 is a flowchart illustrating an example of a wireless power reception method. Referring to FIG. 13, in operation 1310, a receiving unit of a wireless power receiver (i.e., a target device) wirelessly receives a power through mutual resonance between a source resonator of a wireless power transmitter (i.e., a source device) and a target resonator.

In operation 1320, a rectifier of the wireless power receiver rectifies an AC signal received via the target resonator to a DC signal.

In operation 1330, the wireless power receiver determines whether a magnitude of a voltage of the DC signal is less than or equal to a predetermined value. In this example, the magnitude of the voltage of the DC signal refers to a magnitude of a rectified DC voltage, and the predetermined value may be set to, for example, a value of a voltage measured when charging of a battery is started in a CC mode, or a value of a voltage measured when a power is supplied to an application, for example a TV, in the CC mode.

When the magnitude of the voltage of the DC signal is determined to be less than or equal to the predetermined value, in operation 1340, the wireless power receiver electrically connects a load and a power dump resistor, of the wireless power receiver.

When the magnitude of the voltage of the DC signal is determined to be greater than the predetermined value, in operation 1350, the wireless power receiver opens a connection between the load and the power dump resistor.

In operation 1360, the wireless power receiver consumes, using the power dump resistor, a power received from the target resonator, until a voltage applied to the load reaches a predetermined value, so that an amount of a power transferred from the target resonator to the load is less than or equal to an initial accommodation power amount of the load.

In operation 1370, the wireless power receiver transfers the power to the load, without the power being consumed in the power dump resistor.

According to the teachings above, there is provided a wireless power receiver that adjusts a power transferred via a target resonator to a load, based on a charging state of the load. Accordingly, the wireless power receive prevents, in advance, an extreme amount of a voltage from being applied to the load. In more detail, the wireless power receiver determines whether the power received via the target resonator is to be consumed in a power dump resistor, and if so, the wireless power receiver efficiently charges the load with a low standby power. The wireless power receiver may be applied to a system, for example a TV, that uses a power transmitted in real-time, as well as an electronic device operated using an internal battery, for example a mobile cellular phone. Accordingly, if the wireless power receiver is applied to a wireless power transmission system, a very high utility of the wireless power receiver may be obtained.

In the following description, the term "resonator" used in the discussion of FIGS. 14A through 16B refers to both a source resonator and a target resonator. The resonators of FIGS. 14A through 16B may be applied to the resonators of FIGS. 1 through 13.

Figure 14A:
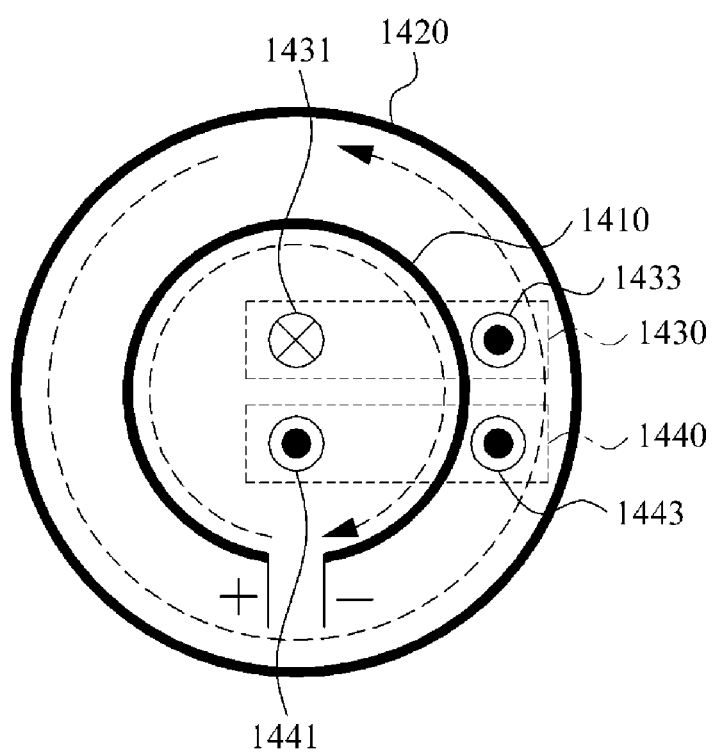
FIGS. 14A and 14B are diagrams illustrating examples of a distribution of a magnetic field in a feeder and a resonator of a wireless power transmitter.
Figure 14B:
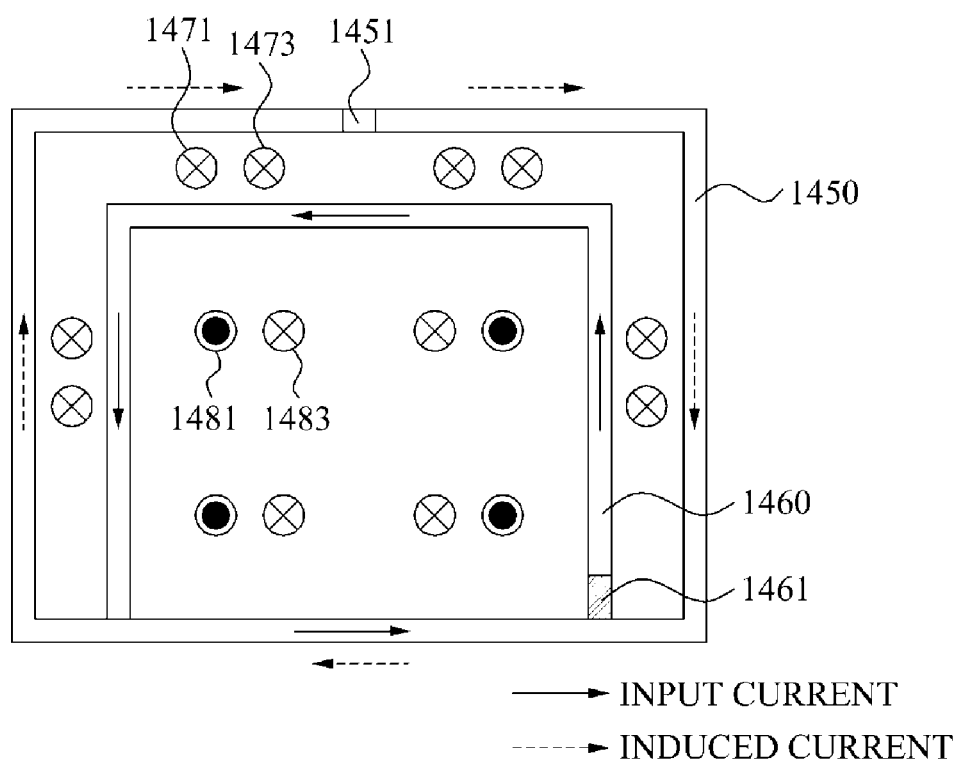

FIGS. 14A and 14B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 14A illustrates an example of a structure of a wireless power transmitter in which a feeder 1410 and a resonator 1420 do not have a common ground. Referring to FIG. 14A, as an input current flows into a feeder 1410 through a terminal labeled "+" and out of the feeder 1410 through a terminal labeled "−", a magnetic field 1430 is formed by the input current. A direction 1431 of the magnetic field 1430 inside the feeder 1410 is into the plane of FIG. 14A, and has a phase that is opposite to a phase of a direction 1433 of the magnetic field 1430 outside the feeder 1410. The magnetic field 1430 formed by the feeder 1410 induces a current to flow in a resonator 1420. The direction of the induced current in the resonator 1420 is opposite to a direction of the input current in the feeder 1410 as indicated by the dashed arrows in FIG. 14A.

The induced current in the resonator 1420 forms a magnetic field 1440. Directions of the magnetic field 1440 are the same at all positions inside the resonator 1420. Accordingly, a direction 1441 of the magnetic field 1440 formed by the resonator 1420 inside the feeder 1410 has the same phase as a direction 1443 of the magnetic field 1440 formed by the resonator 1420 outside the feeder 1410.

Consequently, when the magnetic field 1430 formed by the feeder 1410 and the magnetic field 1440 formed by the resonator 1420 are combined, a strength of the total magnetic field inside the resonator 1420 decreases inside the feeder 1410 and increases outside the feeder 1410. In an example in which power is supplied to the resonator 1420 through the feeder 1410 configured as illustrated in FIG. 14A, the strength of the total magnetic field decreases in the center of the resonator 1420, but increases outside the resonator 1420. In another example in which a magnetic field is randomly distributed in the resonator 1420, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 14B illustrates an example of a structure of a wireless power transmitter in which a resonator 1450 and a feeder 1460 have a common ground. The resonator 1450 includes a capacitor 1451. The feeder 1460 receives a radio frequency (RF) signal via a port 1461. When the RF signal is input to the feeder 1460, an input current is generated in the feeder 1460. The input current flowing in the feeder 1460 forms a magnetic field, and a current is induced in the resonator 1450 by the magnetic field. Additionally, another magnetic field is formed by the induced current flowing in the resonator 1450. In this example, a direction of the input current flowing in the feeder 1460 has a phase opposite to a phase of a direction of the induced current flowing in the resonator 1450. Accordingly, in a region between the resonator 1450 and the feeder 1460, a direction 1471 of the magnetic field formed by the input current has the same phase as a direction 1473 of the magnetic field formed by the induced current, and thus the strength of the total magnetic field increases in the region between the resonator 1450 and the feeder 1460. Conversely, inside the feeder 1460, a direction 1481 of the magnetic field formed by the input current has a phase opposite to a phase of a direction 1483 of the magnetic field formed by the induced current, and thus the strength of the total magnetic field decreases inside the feeder 1460. Therefore, the strength of the total magnetic field decreases in the center of the resonator 1450, but increases outside the resonator 1450.

An input impedance may be adjusted by adjusting an internal area of the feeder 1460. The input impedance refers to an impedance viewed in a direction from the feeder 1460 to the resonator 1450. When the internal area of the feeder 1460 is increased, the input impedance is increased. Conversely, when the internal area of the feeder 1460 is decreased, the input impedance is decreased. Because the magnetic field is randomly distributed in the resonator 1450 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 15A:
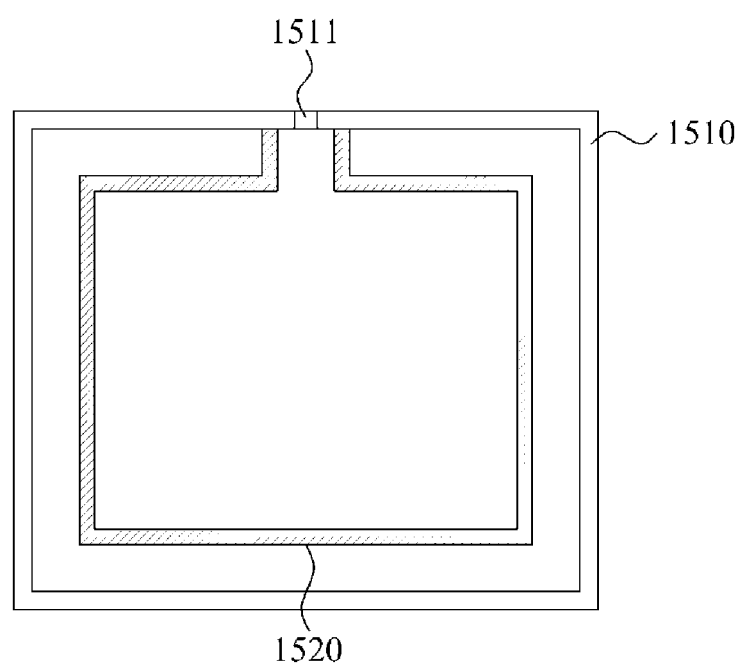
FIGS. 15A and 15B are diagrams illustrating an example of a feeding unit and a resonator of a wireless power transmitter.
Figure 15B:
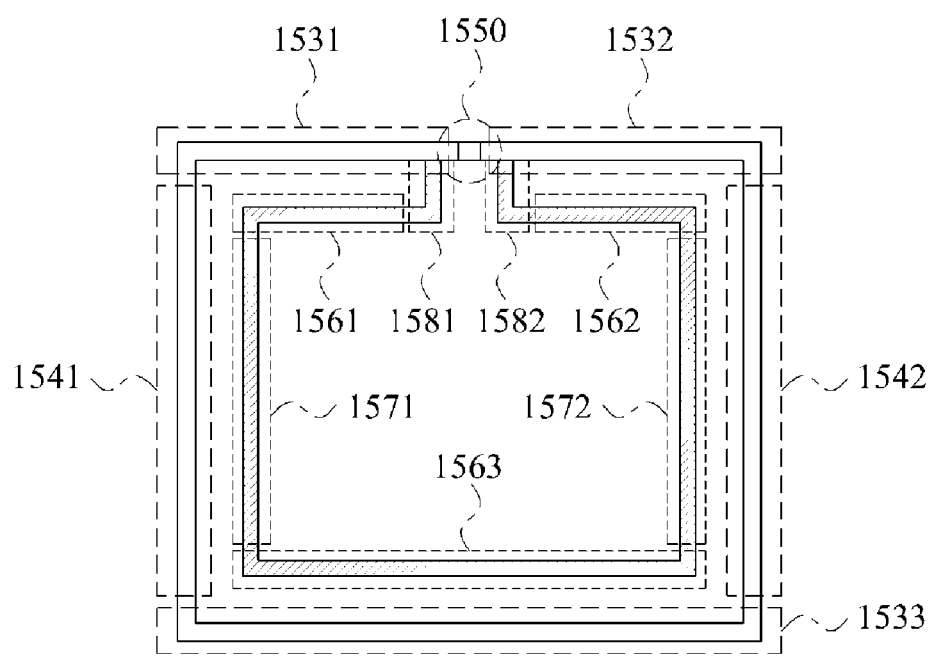

FIGS. 15A and 15B are diagrams illustrating an example of a feeding unit and a resonator of a wireless power transmitter. Referring to FIG. 15A, the wireless power transmitter includes a resonator 1510 and a feeding unit 1520. The resonator 1510 further includes a capacitor 1511. The feeding unit 1520 is electrically connected to both ends of the capacitor 1511.

FIG. 15B illustrates, in greater detail, a structure of the wireless power transmitter of FIG. 15A. The resonator 1510 includes a first transmission line (not identified by a reference numeral in FIG. 15B, but formed by various elements in FIG. 15B as discussed below), a first conductor 1541, a second conductor 1542, and at least one capacitor 1550.

The capacitor 1550 is inserted in series between a first signal conducting portion 1531 and a second signal conducting portion 1532, causing an electric field to be confined within the capacitor 1550. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 15B is separated into two portions that will be referred to as the first signal conducting portion 1531 and the second signal conducting portion 1532. A conductor disposed in a lower portion of the first transmission line in FIG. 15B will be referred to as a first ground conducting portion 1533.

As illustrated in FIG. 15B, the resonator 1510 has a generally two-dimensional (2D) structure. The first transmission line includes the first signal conducting portion 1531 and the second signal conducting portion 1532 in the upper portion of the first transmission line, and includes the first ground conducting portion 1533 in the lower portion of the first transmission line. The first signal conducting portion 1531 and the second signal conducting portion 1532 are disposed to face the first ground conducting portion 1533. A current flows through the first signal conducting portion 1531 and the second signal conducting portion 1532.

One end of the first signal conducting portion 1531 is connected to one end of the first conductor 1541, the other end of the first signal conducting portion 1531 is connected to the capacitor 1550, and the other end of the first conductor 1541 is connected to one end of the first ground conducting portion 1533. One end of the second signal conducting portion 1532 is connected to one end of the second conductor 1542, the other end of the second signal conducting portion 1532 is connected to the other end of the capacitor 1550, and the other end of the second conductor 1542 is connected to the other end of the ground conducting portion 1533. Accordingly, the first signal conducting portion 1531, the second signal conducting portion 1532, the first ground conducting portion 1533, the first conductor 1541, and the second conductor 1542 are connected to each other, causing the resonator 1510 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1550 is inserted into an intermediate portion of the first transmission line. In the example in FIG. 15B, the capacitor 1550 is inserted into a space between the first signal conducting portion 1531 and the second signal conducting portion 1532. The capacitor 1550 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1550 inserted into the first transmission line may cause the resonator 1510 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 1550 is a lumped element capacitor and a capacitance of the capacitor 1550 is appropriately determined, the resonator 1510 may have a characteristic of a metamaterial. If the resonator 1510 is caused to have a negative magnetic permeability by appropriately adjusting the capacitance of the capacitor 1550, the resonator 1510 may also be referred to as an MNG resonator. Various criteria may be applied to determine the capacitance of the capacitor 1550. For example, the various criteria may include a criterion for enabling the resonator 1510 to have the characteristic of the metamaterial, a criterion for enabling the resonator 1510 to have a negative magnetic permeability at a target frequency, a criterion for enabling the resonator 1510 to have a zeroth order resonance characteristic at the target frequency, and any other suitable criterion. Based on any one or any combination of the aforementioned criteria, the capacitance of the capacitor 1550 may be appropriately determined.

The resonator 1510, hereinafter referred to as the MNG resonator 1510, may have a zeroth order resonance characteristic of having a resonance frequency when a propagation constant is "0". If the MNG resonator 1510 has the zeroth order resonance characteristic, the resonance frequency is independent of a physical size of the MNG resonator 1510. By changing the capacitance of the capacitor 1550, the resonance frequency of the MNG resonator 1510 may be changed without changing the physical size of the MNG resonator 1510.

In a near field, the electric field is concentrated in the capacitor 1550 inserted into the first transmission line, causing the magnetic field to become dominant in the near field. The MNG resonator 1510 has a relatively high Q-factor when the capacitor 1550 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 15B, a magnetic core passing through the MNG resonator 1510 may be provided to increase a power transmission distance.

Referring to FIG. 15B, the feeding unit 1520 includes a second transmission line (not identified by a reference numeral in FIG. 15B, but formed by various elements in FIG. 15B as discussed below), a third conductor 1571, a fourth conductor 1572, a fifth conductor 1581, and a sixth conductor 1582.

The second transmission line includes a third signal conducting portion 1561 and a fourth signal conducting portion 1562 in an upper portion of the second transmission line, and includes a second ground conducting portion 1563 in a lower portion of the second transmission line. The third signal conducting portion 1561 and the fourth signal conducting portion 1562 are disposed to face the second ground conducting portion 1563. A current flows through the third signal conducting portion 1561 and the fourth signal conducting portion 1562.

One end of the third signal conducting portion 1561 is connected to one end of the third conductor 1571, the other end of the third signal conducting portion 1561 is connected to one end of the fifth conductor 1581, and the other end of the third conductor 1571 is connected to one end of the second ground conducting portion 1563. One end of the fourth signal conducting portion 1562 is connected to one end of the fourth conductor 1572, the other end of the fourth signal conducting portion 1562 is connected to one end the sixth conductor 1582, and the other end of the fourth conductor 1572 is connected to the other end of the second ground conducting portion 1563. The other end of the fifth conductor 1581 is connected to the first signal conducting portion 1531 at or near where the first signal conducting portion 1531 is connected to one end of the capacitor 1550, and the other end of the sixth conductor 1582 is connected to the second signal conducting portion 1532 at or near where the second signal conducting portion 1532 is connected to the other end of the capacitor 1550. Thus, the fifth conductor 1581 and the sixth conductor 1582 are connected in parallel to both ends of the capacitor 1550. The fifth conductor 1581 and the sixth conductor 1582 are used as an input port to receive an RF signal as an input.

Accordingly, the third signal conducting portion 1561, the fourth signal conducting portion 1562, the second ground conducting portion 1563, the third conductor 1571, the fourth conductor 1572, the fifth conductor 1581, the sixth conductor 1582, and the resonator 1510 are connected to each other, causing the resonator 1510 and the feeding unit 1520 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 1581 or the sixth conductor 1582, input current flows through the feeding unit 1520 and the resonator 1510, generating a magnetic field that induces a current in the resonator 1510. A direction of the input current flowing through the feeding unit 1520 is identical to a direction of the induced current flowing through the resonator 1510, thereby causing a strength of a total magnetic field to increase in the center of the resonator 1510, and decrease near the outer periphery of the resonator 1510.

An input impedance is determined by an area of a region between the resonator 1510 and the feeding unit 1520. Accordingly, a separate matching network used to match the input impedance to an output impedance of a power amplifier may not be necessary. However, if a matching network is used, the input impedance may be adjusted by adjusting a size of the feeding unit 1520, and accordingly a structure of the matching network may be simplified. The simplified structure of the matching network may reduce a matching loss of the matching network.

The second transmission line, the third conductor 1571, the fourth conductor 1572, the fifth conductor 1581, and the sixth conductor 1582 of the feeding unit may have a structure identical to the structure of the resonator 1510. For example, if the resonator 1510 has a loop structure, the feeding unit 1520 may also have a loop structure. As another example, if the resonator 1510 has a circular structure, the feeding unit 1520 may also have a circular structure.

Figure 16A:
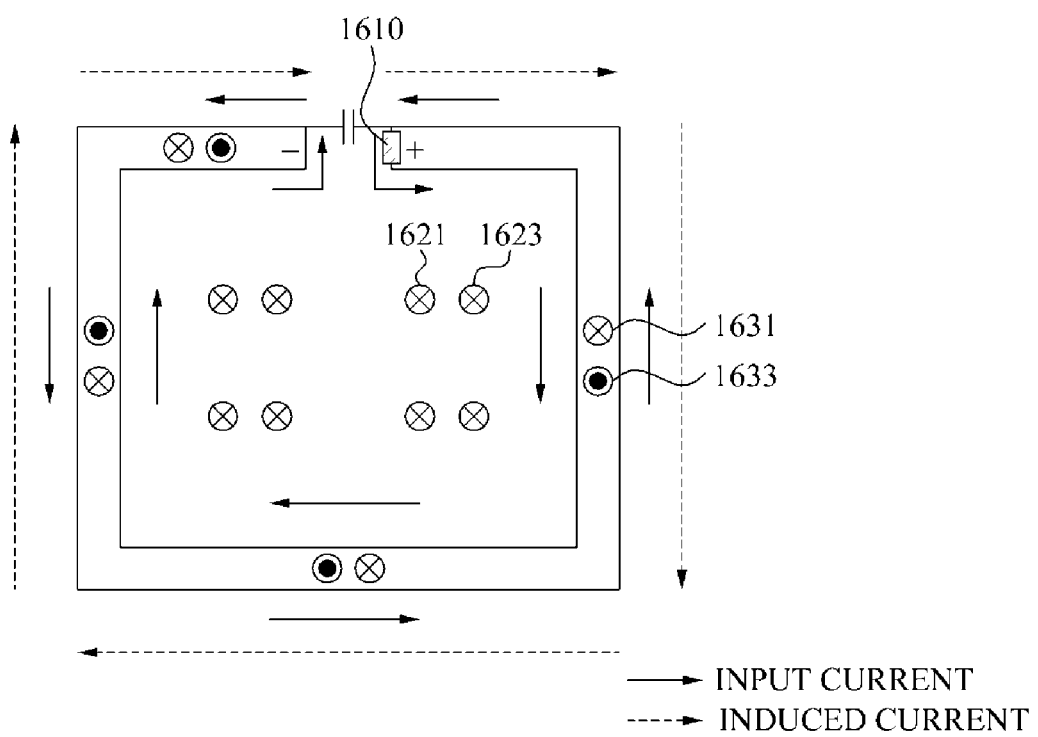
FIG. 16A is a diagram illustrating an example of a distribution of a magnetic field in a resonator that is produced by feeding of a feeding unit, of a wireless power transmitter.

FIG. 16A is a diagram illustrating an example of a distribution of a magnetic field in a resonator that is produced by feeding of a feeding unit, of a wireless power transmitter. FIG. 16A more simply illustrates the resonator 1510 and the feeding unit 1520 of FIGS. 15A and 15B, and the names of the various elements in FIG. 15B will be used in the following description of FIG. 16A without reference numerals.

A feeding operation may be an operation of supplying power to a source resonator in wireless power transmission, or an operation of supplying AC power to a rectifier in wireless power transmission. FIG. 16A illustrates a direction of input current flowing in the feeding unit, and a direction of induced current flowing in the source resonator. Additionally, FIG. 16A illustrates a direction of a magnetic field formed by the input current of the feeding unit, and a direction of a magnetic field formed by the induced current of the source resonator.

Referring to FIG. 16A, the fifth conductor or the sixth conductor of the feeding unit 1520 may be used as an input port 1610. In FIG. 16A, the sixth conductor of the feeding unit is being used as the input port 1610. An RF signal is input to the input port 1610. The RF signal may be output from a power amplifier. The power amplifier may increase and decrease an amplitude of the RF signal based on a power requirement of a target device. The RF signal input to the input port 1610 is represented in FIG. 16A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 16A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 16A, within the feeding unit, a direction 1621 of the magnetic field generated by the input current flowing in the feeding unit is identical to a direction 1623 of the magnetic field generated by the induced current flowing in the resonator. Accordingly, a strength of the total magnetic field may increases inside the feeding unit.

In contrast, as illustrated in FIG. 16A, in a region between the feeding unit and the resonator, a direction 1633 of the magnetic field generated by the input current flowing in the feeding unit is opposite to a direction 1631 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 16A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 16B:
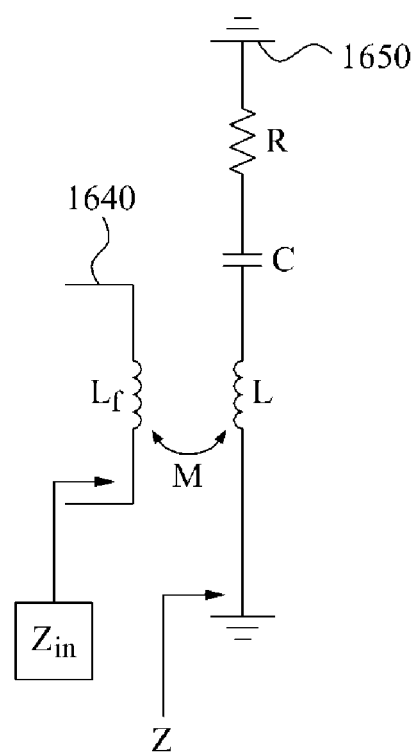
FIG. 16B is a diagram illustrating examples of equivalent circuits of a feeding unit and a resonator of a wireless power transmitter.

FIG. 16B is a diagram illustrating examples of equivalent circuits of a feeding unit and a resonator of a wireless power transmitter. Referring to FIG. 16B, a feeding unit 1640 and a resonator 1650 may be represented by the equivalent circuits in FIG. 16B. The feeding unit 1640 is represented as an inductor having an inductance $L_f$, and the resonator 1650 is represented as a series connection of an inductor having an inductance L coupled to the inductance $L_f$ of the feeding unit 1640 by a mutual inductance M, a capacitor having a capacitance C, and a resistor having a resistance R. An example of an input impedance $Z_{in}$ viewed in a direction from the feeding unit 1640 to the resonator 1650 may be expressed by the following Equation 1:

$$Z_{in} = \frac{(\omega M)^2}{Z} \quad (1)$$

In Equation 1, M denotes a mutual inductance between the feeding unit 1640 and the resonator 1650, ω denotes a resonance frequency of the feeding unit 1640 and the resonator 1650, and Z denotes an impedance viewed in a direction from the resonator 1650 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1640 and the resonator 1650. The area of the region between the feeding unit 1640 and the resonator 1650 may be adjusted by adjusting a size of the feeding unit 1640, thereby adjusting the mutual inductance M and the input impedance $Z_{in}$. Since the input impedance $Z_{in}$ may be adjusted by adjusting the size of the feeding unit 1640, it may be unnecessary to use a separate matching network to perform impedance matching with an output impedance of a power amplifier.

In a target resonator and a feeding unit included in a wireless power receiver, a magnetic field may be distributed as illustrated in FIG. 16A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 16A, a direction of the induced current flowing in the target resonator will be identical to a direction of the induced current flowing in the feeding unit. Accordingly, for the reasons discussed above in connection with FIG. 16A, a strength of the total magnetic field will increase inside the feeding unit, and will decrease in a region between the feeding unit and the target resonator.

Figure 17:
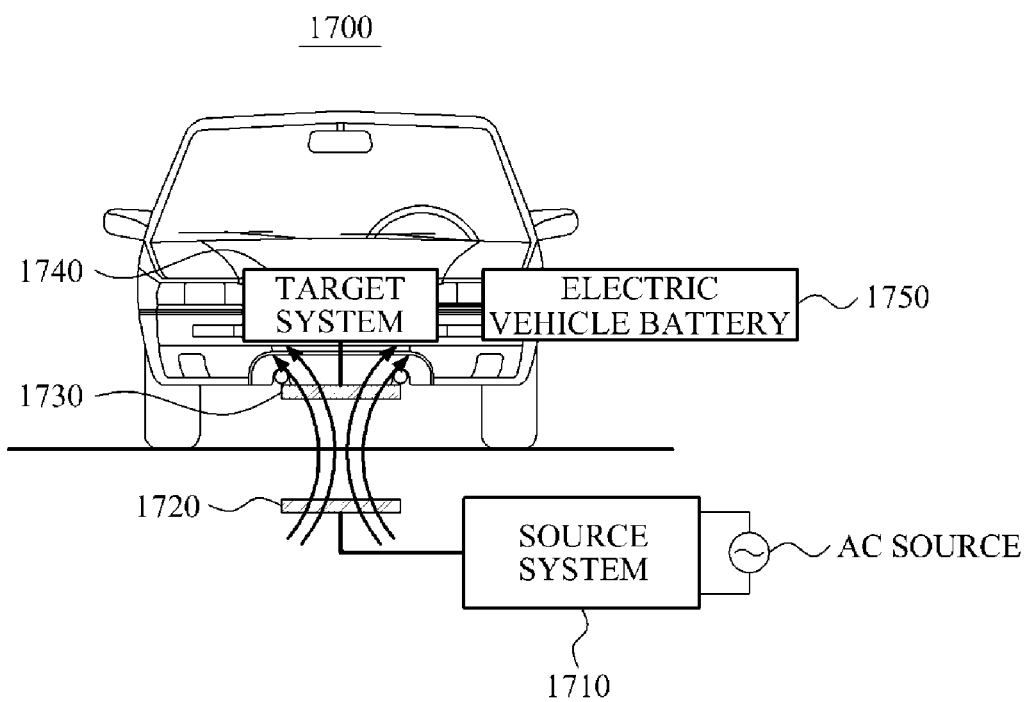
FIG. 17 is a diagram illustrating an example of an electric vehicle charging system.

FIG. 17 is a diagram illustrating an example of an electric vehicle charging system. Referring to FIG. 17, an electric vehicle charging system 1700 includes a source system 1710, a source resonator 1720, a target resonator 1730, a target system 1740, and an electric vehicle battery 1750.

In one example, the electric vehicle charging system 1700 has a structure similar to the structure of the wireless power transmission system of FIG. 1. The source system 1710 and the source resonator 1720 in the electric vehicle charging system 1700 operate as a source. The target resonator 1730 and the target system 1740 in the electric vehicle charging system 1700 operate as a target.

In one example, the source system 1710 includes an alternating current-to-direct current (AC/DC) converter, a power detector, a power converter, a control and communication (control/communication) unit similar to those of the source device 110 of FIG. 1. In one example, the target system 1740 includes a rectifier, a DC-to-DC (DC/DC) converter, a switch, a charging unit, and a control/communication unit similar to those of the target device 120 of FIG. 1. The electric vehicle battery 1750 is charged by the target system 1740. The electric vehicle charging system 1700 may use a resonant frequency in a band of a few kHz to tens of MHz.

The source system 1710 generates power based on a type of the vehicle being charged, a capacity of the electric vehicle battery 1750, and a charging state of the electric vehicle battery 1750, and wirelessly transmits the generated power to the target system 1740 via a magnetic coupling between the source resonator 1720 and the target resonator 1730.

The source system 1710 may control an alignment of the source resonator 1720 and the target resonator 1730. For example, when the source resonator 1720 and the target resonator 1730 are not aligned, the controller of the source system 1710 may transmit a message to the target system 1740 to control the alignment of the source resonator 1720 and the target resonator 1730.

For example, when the target resonator 1730 is not located in a position enabling maximum magnetic coupling, the source resonator 1720 and the target resonator 1730 are not properly aligned. When a vehicle does not stop at a proper position to accurately align the source resonator 1720 and the target resonator 1730, the source system 1710 may instruct a position of the vehicle to be adjusted to control the source resonator 1720 and the target resonator 1730 to be aligned. However, this is just an example, and other methods of aligning the source resonator 1720 and the target resonator 1730 may be used.

The source system 1710 and the target system 1740 may transmit or receive an ID of a vehicle and exchange various messages by performing communication with each other.

The descriptions of FIGS. 2 through 16B are also applicable to the electric vehicle charging system 1700. However, the electric vehicle charging system 1700 may use a resonant frequency in a band of a few kHz to tens of MHz, and may wirelessly transmit power that is equal to or higher than tens of watts to charge the electric vehicle battery 1750.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power receiver comprising:
    a receiving unit configured to wirelessly receive a power;
    a rectifier configured to rectify an alternating current (AC) signal of the power to a direct current (DC) signal;
    a power consumer configured to consume the power, until a voltage applied to a load reaches a predetermined value, so that an amount of a power transferred from the receiving unit to the load is less than or equal to an initial accommodation power amount of the load; and
    a controller configured to control an operation of the power consumer based on a magnitude of the DC signal,
    wherein the initial accommodation power amount is determined based on a value of a current that may be accommodated in the load when charging of the load is started.

2. The wireless power receiver of claim 1, wherein the controller is further configured to:
    control the power consumer to be operated when the magnitude of the DC signal is less than a predetermined value; and
    control the operation of the power consumer to be suspended when the magnitude of the DC signal is greater than or equal to the predetermined value.

3. The wireless power receiver of claim 1, wherein the controller comprises:
    a current detector configured to detect a current of the DC signal; and
    a comparator configured to
        compare the current with a predetermined current,
        output a high signal when the current is less than the predetermined current to control the power consumer to be operated, and
        output a low signal when the current is greater than or equal to the predetermined current to control an operation of the power consumer to be suspended.

4. The wireless power receiver of claim 1, wherein the power consumer comprises:
    a power dump resistor comprising a resistance that is in inverse proportion to the initial accommodation power amount; and
    a switch configured to enable the power dump resistor to be operated or suspended.

5. The wireless power receiver of claim 1, further comprising:
    a rectifier configured to rectify an alternating current (AC) signal of the power to a direct current (DC) signal; and
    a DC-to-DC (DC/DC) converter configured to convert a magnitude of the DC signal to a magnitude required by the load.

6. The wireless power receiver of claim 5, wherein the DC/DC converter comprises:
    a voltage measuring unit configured to measure a voltage applied to an on-resistor of a transistor connected in series to the rectifier;
    an amplifier configured to amplify the measured voltage; and
    a comparator configured to
        compare the amplified voltage with a predetermined voltage,
        output a high signal when the amplified voltage is less than the predetermined voltage to control the power consumer to be operated, and
        output a low signal when the amplified voltage is greater than or equal to the predetermined voltage to control an operation of the power consumer to be suspended.

7. The wireless power receiver of claim 5, wherein the DC/DC converter comprises:
    a switch controller configured to control an operation switch of the power consumer based on a magnitude of a voltage applied to a capacitor when the receiving unit receives the power.

8. The wireless power receiver of claim 7, wherein the switch controller is further configured to:

power on the operation switch to control the power consumer to be operated when the magnitude of the voltage applied to the capacitor is less than or equal to a predetermined value; and power off the operation switch to control the operation of the power consumer to be suspended when the magnitude of the voltage applied to the capacitor is greater than the predetermined value.

9. The wireless power receiver of claim 7, wherein the switch controller comprises:

a power supply configured to supply an amount of a current to the capacitor when the receiving unit receives the power; and a capacitor configured to store the current.

10. The wireless power receiver of claim 1, further comprising:

a rectifier configured to rectify an alternating current (AC) signal of the power to a direct current (DC) signal;

a controller configured to control an operation of the power consumer based on a magnitude of the DC signal; and an interrupting unit configured to interrupt an electrical connection between the rectifier and the load based on the magnitude of the DC signal.

11. The wireless power receiver of claim 10, wherein the interrupting unit is further configured to:

interrupt the electrical connection when the magnitude of the DC signal is greater than a magnitude of a voltage that is allowed in the load.

12. A wireless power reception method comprising:

wirelessly receiving a power;

rectifying an alternating current (AC) signal of the power to a direct current (DC) signal;

consuming the power, until a voltage applied to a load reaches a predetermined value, so that an amount of a power transferred from a receiving unit to the load is less than or equal to an initial accommodation power amount of the load; and controlling the consuming of the power based on a magnitude of the DC signal, wherein the initial accommodation power amount is determined based on a value of a current that may be accommodated in the load when charging of the load is started.

13. The wireless power reception method of claim 12, further comprising:

consuming the power when the magnitude of the DC signal is less than a predetermined value; and suspending the consuming of the power when the magnitude of the DC signal is greater than or equal to the predetermined value.

14. The wireless power reception method of claim 12, further comprising:

detecting a current of the DC signal;

comparing the current with a predetermined current;

consuming the power when the current is less than the predetermined current; and suspending the consuming of the power when the current is greater than or equal to the predetermined current.

15. The wireless power reception method of claim 12, further comprising:

rectifying, by a rectifier, an alternating current (AC) signal of the power to a direct current (DC) signal; and converting a magnitude of the DC signal to a magnitude required by the load.

16. The wireless power reception method of claim 15, further comprising:

measuring a voltage applied to an on-resistor of a transistor connected in series to the rectifier;

amplifying the measured voltage;

comparing the amplified voltage with a predetermined voltage;

consuming the power when the amplified voltage is less than the predetermined voltage; and suspending the consuming of the power when the amplified voltage is greater than or equal to the predetermined voltage.

17. The wireless power reception method of claim 12, further comprising:

controlling the consuming of the power based on a magnitude of a voltage applied to a capacitor when the power is received.

18. The wireless power reception method of claim 12, further comprising:

rectifying, by a rectifier, an alternating current (AC) signal of the power to a direct current (DC) signal;

controlling the consuming of the power based on a magnitude of the DC signal; and interrupting an electrical connection between the rectifier and the load based on the magnitude of the DC signal.

19. The wireless power receiver of claim 1, wherein the predetermined value is corresponding to a value of the voltage measured when the charging of the load is started in a constant current (CC) mode.

20. The wireless power reception method of claim 12, wherein the predetermined value is corresponding to a value of the voltage measured when the charging of the load is started in a constant current (CC) mode.

* * * * *